(12) United States Patent
Matlock

(10) Patent No.: US 8,069,483 B1
(45) Date of Patent: Nov. 29, 2011

(54) DEVICE FOR AND METHOD OF WIRELESS INTRUSION DETECTION

(75) Inventor: Kristen L. Matlock, Washington, DC (US)

(73) Assignee: The United States States of America as represented by the Director of the National Security Agency, Washington, DC (US)

( * ) Notice: Subject to any disclaimer, the term of this patent is extended or adjusted under 35 U.S.C. 154(b) by 1102 days.

(21) Appl. No.: 11/602,430

(22) Filed: Oct. 19, 2006

(51) Int. Cl.
*H04L 29/14* (2006.01)
*G06F 21/20* (2006.01)

(52) U.S. Cl. .............................. 726/23; 726/13; 713/154

(58) Field of Classification Search .................... 726/22, 726/23, 24, 25, 26; 713/153, 154
See application file for complete search history.

(56) References Cited

U.S. PATENT DOCUMENTS

| | | | |
|---|---|---|---|
| 7,042,852 B2 | 5/2006 | Hrastar | |
| 7,058,796 B2 | 6/2006 | Lynn et al. | |
| 7,086,089 B2 | 8/2006 | Hrastar et al. | |
| 7,089,586 B2 | 8/2006 | Kilgore | |
| 2003/0135762 A1 | 7/2003 | Macaulay | |
| 2003/0217289 A1 | 11/2003 | Ammon et al. | |
| 2003/0237000 A1 | 12/2003 | Denton et al. | |
| 2004/0028001 A1 | 2/2004 | Billhartz | |
| 2004/0107219 A1 | 6/2004 | Rosenberger | |
| 2004/0162995 A1 | 8/2004 | Muaddi et al. | |
| 2004/0235453 A1 | 11/2004 | Chen et al. | |
| 2005/0037733 A1 | 2/2005 | Coleman et al. | |
| 2005/0054326 A1 | 3/2005 | Rogers | |
| 2005/0136891 A1 | 6/2005 | Wang et al. | |
| 2005/0144544 A1 | 6/2005 | Gariador et al. | |
| 2005/0202800 A1 | 9/2005 | Wang | |
| 2005/0213553 A1 * | 9/2005 | Wang | 370/349 |
| 2006/0002331 A1 | 1/2006 | Bhagwat et al. | |
| 2006/0085543 A1 | 4/2006 | Hrastar et al. | |
| 2006/0150250 A1 * | 7/2006 | Lee et al. | 726/23 |
| 2006/0193299 A1 | 8/2006 | Winget et al. | |
| 2006/0193300 A1 | 8/2006 | Rawat et al. | |
| 2006/0197702 A1 | 9/2006 | Jones | |
| 2006/0200862 A1 | 9/2006 | Olson et al. | |
| 2008/0043686 A1 * | 2/2008 | Sperti et al. | 370/338 |

OTHER PUBLICATIONS

Applicant Admitted prior Art, Figures 1 and 2 of the disclosed drawings.*

* cited by examiner

*Primary Examiner* — Minh Dinh
*Assistant Examiner* — Izunna Okeke
(74) *Attorney, Agent, or Firm* — Robert D. Morelli

(57) ABSTRACT

A device for and method of detecting intrusion into a wireless network that includes a configuration file, a rules files, a main processor, a set packet processor, an initialize preprocessor, a parse rules file, an interface thread unit, a process packet unit, a decoder, a preprocess unit connected to the process packet unit; at least one preprocessor consisting of a rogue access point and transmit channel preprocessor, a NETSTUMBLER preprocessor, a MAC spoofing preprocessor, a DEAUTH flood preprocessor, an AUTH flood preprocessor, a rogue client preprocessor, a bridged network preprocessor, a rogue client valid access point preprocessor, valid client rogue access point preprocessor, an ad-hoc network preprocessor, a wrong channel preprocessor, a cloaking policy violation preprocessor, an encryption policy violation preprocessor, and a null SSID association policy violation preprocessor; and a detector.

21 Claims, 15 Drawing Sheets

DEVICE FOR AND METHOD OF WIRELESS INTRUSION DETECTION

FIELD OF INVENTION

The present invention relates, in general, to electrical computers and digital processing systems support and, in particular, to security of computer networks.

BACKGROUND OF THE INVENTION

A computer can communicate via a local area network (LAN) without being physically connected to the LAN. This is achieved by the computer broadcasting messages to, and receiving messages from, the LAN using radio frequency (RF) energy. Such capability is commonly referred to as wireless fidelity or Wi-Fi.

The Institute of Electrical and Electronics Engineers (IEEE) has developed a family of specifications concerning Wi-Fi LANs (WLANs). IEEE Specification 802.11 concerns WLAN transmission of 1 or 2 Megabits per second (Mbps) in the 2.4 GHz band. IEEE Specification 802.11a concerns WLAN transmission up to 54 Mbps in the 5 GHz band. IEEE Specification 802.11b concerns WLAN transmission of 11 Mbps in the 2.4 GHz band. IEEE Specification 802.11g concerns WLAN transmission of 20 Mbps or more in the 2.4 GHz band.

WLAN's have proliferated around the globe and are used in industry, government, and in the home. WLANs provide mobility and the benefits that derive therefrom. However, there is also risk involved in using a WLAN. Computers connected to WLANs are susceptible to attack as are computers connected to LANs, and are susceptible to attacks that are unique to WLANs (e.g., rogue access points that divert computer traffic). Therefore, there is a need to detect intrusions into wireless computer networks. A wireless intrusion detection system (WIDS) is used to provide protection for a WLAN by providing a more secure operating environment. SNORT is a freely available intrusion detection system that comes in a wireless version.

FIG. 1 is a flowchart of SNORT 1. The inputs to SNORT 1 are the rules file 2 and a master configuration file 3 that contains arguments for preprocessors. The function SnortMain 4 is the heart of SNORT 1. SnortMain 4 calls the function SetPktProcessor 5, which makes a decision about which decoder function should be used to process incoming packets. SnortMain 4 also calls InitPreprocessors 6 to initialize preprocessors and ParseRulesFile 7 to parse the rules file 2. Then, SnortMain 4 calls InterfaceThread 8 to create one thread per interface. The InterfaceThread 8 starts a loop that continuously reads all received packets. The loop is handled by the function ProcessPacket 9. ProcessPacket 9 calls Decode 10 to decode the current packet. Once the packet has been decoded, ProcessPacket 9 calls the Preprocess 11. Preprocess 11 sequentially calls various preprocessors 12, 13. Finally Preprocess 11 calls Detect 14, which applies the rules from the rules file 2 to the current packet. If a rule matches the current packet, an alert may be generated or the packet may be logged, depending on what is specified in the rules file 2. The rules file 2 detects suspicious or irregular behavior that could indicate intrusion, based on the values of certain fields in a single packet header. The preprocessors 12, 13 on the other hand, are used to detect suspicious behavior based on information gained from many packets, or based on information gained from a single packet combined with input from the configuration file 3 and a more sophisticated detection algorithm.

FIG. 2 is a flowchart of Wireless SNORT 21, which is basically SNORT 1 described in FIG. 1 with a new decoder to interpret IEEE Specification 802.11 headers, a new Wi-Fi rules file for signature-based detection, new data structures to store IEEE Specification 802.11 header information, new logging and alerting functions for IEEE Specification 802.11, and new preprocessors to detect intrusions specific to wireless networks. The inputs to wireless SNORT 21 are the rules file 22 and a master configuration file 23 that contains arguments for preprocessors. The function SnortMain 24 is the heart of wireless SNORT 21. SnortMain 24 calls the function SetPktProcessor 25, which makes a decision about which decoder function should be used to process incoming packets. SnortMain 24 also calls InitPreprocessors 26 to initialize preprocessors and ParseRulesFile 27 to parse the rules file 22. Then, SnortMain 24 calls InterfaceThread 28 to create one thread per interface. The InterfaceThread 28 starts a loop that continuously reads all received packets. The loop is handled by the function ProcessPacket 29. ProcessPacket 29 calls Decode 30 to decode the current packet. Once the packet has been decoded, ProcessPacket 29 calls the Preprocess 31: Preprocess 31 sequentially calls various preprocessors 32-36. The new preprocessors include a preprocessor to detect a rogue access point (AP) 32, a reprocessor to detect a client using the program Netstumbler 33, a preprocessor to detects Media Access Control (MAC) address spoofing 34, a preprocessor to detect denial-of-service attacks that use DEAUTH flooding 35, and a preprocessor to detect denial-of-service attacks that use AUTH flooding 36. Preprocessors in SNORT 1 of FIG. 1 that are compatible with wireless SNORT 21 of FIG. 2 may also be included in wireless SNORT 21. Finally Preprocess 31 calls Detect 37, which applies the rules from the rules file 22 to the current packet. If a rule matches the current packet, an alert may be generated or the packet may be logged, depending on what is specified in the rules file 22. The rules file 22 detects suspicious or irregular behavior that could indicate intrusion, based on the values of certain fields in a single packet header. The preprocessors 32-36 on the other hand, are used to detect suspicious behavior based on information gained from many packets, or based on information gained from a single packet combined with input from the configuration file 23 and a more sophisticated detection algorithm.

U.S. Pat. No. 7,042,852, entitled "SYSTEM AND METHOD FOR WIRELESS LAN DYNAMIC CHANNEL CHANGE WITH HONEYPOT TRAP", discloses an intrusion detection device and method that communicates with an intruder by emulating the identification characteristics of a potentially compromised access point. The present invention does not communicate with an intruder by emulating the identification characteristics of a potentially compromised access point as does U.S. Pat. No. 7,042,852. U.S. Pat. No. 7,042,852 hereby incorporated by reference into the specification of the present invention.

U.S. Pat. No. 7,058,796, entitled "METHOD AND SYSTEM FOR ACTIVELY DEFENDING A WIRELESS LAN AGAINST ATTACKS", discloses a method of and device for defending a wireless LAN by transmitting a jamming signal, a signal to introduce CRC errors, or a signal to make it more difficulty to break encryption used by the network. The present invention does not transmit a jamming signal, a signal to introduce CRC errors, or a signal to make it more difficulty to break encryption used by the network as does U.S. Pat. No. 7,058,796. U.S. Pat. No. 7,058,796 is hereby incorporated by reference into the specification of the present invention.

U.S. Pat. No. 7,086,089, entitled "SYSTEMS AND METHODS FOR NETWORK SECURITY," discloses devices and methods of detecting security violations by applying one or more tests to received data, including signature test, protocol test, statistical anomaly test, policy test, and defending the network by jamming, generating CRC errors, transmitting random frames, locking down the network, and changing channels. The present invention does not defend a network by jamming, generating CRC errors, transmitting random frames, locking down the network, and changing channels as does U.S. Pat. No. 7,086,089. U.S. Pat. No. 7,086,089 is hereby incorporated by reference into the specification of the present invention.

U.S. Pat. No. 7,089,586, entitled "FIREWALL PROTECTION FOR WIRELESS USERS," discloses a system for protecting a mobile wireless user via a firewall employed at the wired line, or ISP side, of the wireless link in a wireless network. The present invention does not employ a firewall at the wired line, or ISP side, of the wireless link in a wireless network as does U.S. Pat. No. 7,089,586. U.S. Pat. No. 7,089,586 is hereby incorporated by reference into the specification of the present invention.

U.S. Pat. Appl. No. 20030135762, entitled "WIRELESS NETWORKS SECURITY SYSTEM," discloses a system for monitoring wireless networks using a directional antenna for locating unauthorized or threatening devices. The present invention does not employ a directional antenna as does U.S. Pat. Appl. No. 20030135762. U.S. Pat. Appl. No. 20030135762 is hereby incorporated by reference into the specification of the present invention.

U.S. Pat. Appl. No. 20030217289, entitled "METHOD AND SYSTEM FOR WIRELESS INTRUSION DETECTION," discloses a method of and system for monitoring authorized and unauthorized access to wireless network using one or more nodes that communicate via an out of band means that is separate from the network. The present invention does not employ an out of band means that is separate from the network as does U.S. Pat. Appl. No. 20030217289. U.S. Pat. Appl. No. 20030217289 is hereby incorporated by reference into the specification of the present invention.

U.S. Pat. Appl. No. 20030237000, entitled "METHOD, SYSTEM AND PROGRAM PRODUCT FOR DETECTING INTRUSION OF A WIRELESS NETWORK," discloses a method of and system for detecting intrusion of a wireless network by comparing a received data stream to a valid data stream. If the received data stream deviates from the valid data stream, the data stream is compared to a known intrusion data stream. The present invention includes more methods and devices than U.S. Pat. Appl. No. 20030237000. U.S. Pat. Appl. No. 20030237000 is hereby incorporated by reference into the specification of the present invention.

U.S. Pat. Appl. No. 20040028001, entitled "WIRELESS LOCAL OR METROPOLITAN AREA NETWORK WITH INTRUSION DETECTION FEATURES AND RELATED METHODS," discloses a method of and system for detecting intrusion of a wireless network that includes a policing station that is separate from the wireless station. The present invention includes more devices and methods than does U.S. Pat. Appl. No. 20040028001. U.S. Pat. Appl. No. 20040028001 is hereby incorporated by reference into the specification of the present invention.

U.S. Pat. Appl. No. 20040107219, entitled "SYSTEM AND METHOD FOR WIRELESS LOCAL AREA NETWORK MONITORING AND INTRUSION DETECTION," discloses a method of and system for detecting intrusion of a wireless network by profiling wireless devices, determining threat levels posed by wireless devices, and prevents traffic from being received by a wireless device from a wireless device determined to pose too great a threat. The present invention includes more devices and methods than does U.S. Pat. Appl. No. 20040107219. U.S. Pat. Appl. No. 20040107219 is hereby incorporated by reference into the specification of the present invention.

U.S. Pat. Appl. No. 20040162995, entitled "INTRUSION DETECTION SYSTEM FOR WIRELESS NETWORKS," discloses a method of and system for detecting intrusion of a wireless network using monitoring stations and fusion stations to monitor and correlate attributes of signals, including carrier frequency, spurious emissions, power-on and power-down transients, direct and multipath received signal strength, signal-to-noise ration, direction and angle of arrival, time of arrival, position, range, time dispersion, and Doppler shift and polarization. The present invention does not employ monitoring and fusion stations to receive and correlate signals as does U.S. Pat. Appl. No. 20040162995. U.S. Pat. Appl. No. 20040162995 is hereby incorporated by reference into the specification of the present invention.

U.S. Pat. Appl. No. 20040235453, entitled "ACCESS POINT INCORPORATING A FUNCTION OF MONITORING ILLEGAL WIRELESS COMMUNICATIONS," discloses a device for detecting the presence of unauthorized wireless communications at an access point by including an additional receiver to receive and monitor all channels to determine if unauthorized wireless communications are present. The present invention does more than does U.S. Pat. Appl. No. 20040235453. U.S. Pat. Appl. No. 20040235453 is hereby incorporated by reference into the specification of the present invention.

U.S. Pat. Appl. No. 20050037733, entitled "METHOD AND SYSTEM FOR WIRELESS INTRUSION DETECTION PREVENTION AND SECURITY MANAGEMENT," discloses a device for and method of wireless intrusion detection that integrates Open System Interconnection (OSI) Layer 1 (i.e., the physical layer) and a smart wireless RF antenna with an OSI Layer 2 (i.e., a data link layer) wireless security system management platform. The present invention does not integrate OSI Layer 1 and a smart wireless RF antenna with an OSI Layer 2 wireless security system management platform as does U.S. Pat. Appl. No. 20050037733. U.S. Pat. Appl. No. 20050037733 is hereby incorporated by reference into the specification of the present invention.

U.S. Pat. Appl. No. 20050054326, entitled "METHOD AND SYSTEM FOR SECURING AND MONITORING A WIRELESS NETWORK," discloses a device for and method of securing and monitoring a wireless network by scanning a wireless network, building a profile for each detected node, requiring an administrator to determine if the detected node may access the network or not, detecting unauthorized nodes, and limiting an unauthorized node's access to the network. The present invention does more than does U.S. Pat. Appl. No. 20050054326. U.S. Pat. Appl. No. 20050054326 is hereby incorporated by reference into the specification of the present invention.

U.S. Pat. Appl. Nos. 20050136891, 20050202800, and 20050213553, entitled "WIRELESS LAN INTRUSION DETECTION BASED ON LOCATION," "SYSTEM AND METHOD FOR CLIENT-SERVER-BASED WIRELESS INTRUSION DETECTION," and "METHOD FOR WIRELESS LAN INTRUSION DETECTION BASED ON PROTOCOL ANOMALY ANALYSIS" disclose devices for determining intrusion into a wireless network by locating transmitters using signals transmitted thereby, recording the locations of the transmitters that were assigned by an administrator, subsequently detecting signals from these transmitters, determining the locations of the transmitters using the received signals, comparing the determined locations to the recorded location, and initiating an alarm if a location derived from a signal does not match the corresponding recorded location. The present invention does not determine, record, and compare locations as does U.S. Pat. Appl. Nos. 20050136891, 20050202800, and 20050213553. U.S. Pat. Appl. Nos. 20050136891, 20050202800, and 20050213553 are hereby incorporated by reference into the specification of the present invention.

U.S. Pat. Appl. No. 20050144544, entitled "MECHANISM FOR DETECTION OF ATTACK BASED ON IMPERSONATION IN A WIRELESS NETWORK," discloses a device for determining an attack based on impersonation by receiving a transmission via a secure link and via wireless transmission, comparing the two, and determining that an attack by impersonation is present if the two transmissions are not identical. The present invention does not employ a secure link and compare function as does U.S. Pat. Appl. No. 20050144544. U.S. Pat. Appl. No. 20050144544 is hereby incorporated by reference into the specification of the present invention.

U.S. Pat. Appl. No. 20060085543, entitled "PERSONAL WIRELESS MONITORING AGENT," discloses a device for monitoring a wireless device by comparing communications against policy guidelines, determining whether a violation has occurred, and informing an authorized user of any violation. The present invention does more than does U.S. Pat. Appl. No. 20060085543. U.S. Pat. Appl. No. 20060085543 is hereby incorporated by reference into the specification of the present invention.

U.S. Pat. Appl. Nos. 20060002331 and 20060193300, entitled "AUTOMATED SNIFFER APPARATUS AND METHOD FOR WIRELESS LOCAL AREA NETWORK SECURITY" and "METHOD AND APPARATUS FOR MONITORING MULTIPLE NETWORK SEGMENTS IN LOCAL AREA NETWORKS FOR COMPLIANCE WITH WIRELESS SECURITY POLICY", disclose a device for securing a wireless network by using a plurality of sniffers spatially arranged in a selected geographic region to provide substantial radio coverage over at least a portion of the geographic location. The present invention employs more devices and methods than does U.S. Pat. Appl. Nos. 20060002331 and 20060193300. U.S. Pat. Appl. Nos. 20060002331 and 20060193300 are hereby incorporated by reference into the specification of the present invention.

U.S. Pat. Appl. No. 20060193299, entitled "LOCATION-BASED ENHANCEMENTS FOR WIRELESS INTRUSION DETECTION," discloses a device for wireless intrusion detection by identifying the physical location of each access point, generating a message integrity code for each access point that indicates the location of the access point, determining the signal strength of a received transmission, and determining whether or not the location in message integrity code is consistent with the identity of the corresponding access point and whether or not the signal strength is consistent with the corresponding location. The present invention does not employ a message integrity code and a signal strength measurement as does U.S. Pat. Appl. No. 20060193299. U.S. Pat. Appl. No. 20060193299 is hereby incorporated by reference into the specification of the present invention.

U.S. Pat. Appl. No. 20060197702, entitled "WIRELESS HOST INTRUSION DETECTION SYSTEM," discloses a device for wireless intrusion detection by identifying a signal from a wireless access point involving a full hand-off procedure or a change in signal such as a change in signal strength or a change in the direction of arrival. Upon the detection of any of these events, an intrusion alert is made. The present invention does not identify a full hand-off procedure or a change in signal as does U.S. Pat. Appl. No. 20060197702. U.S. Pat. Appl. No. 20060197702 is hereby incorporated by reference into the specification of the present invention.

U.S. Pat. Appl. No. 20060200862, entitled "METHOD AND APPARATUS FOR LOCATING ROGUE ACCESS POINT SWITCH PORTS IN A WIRELESS NETWORK RELATED PATENT APPLICATIONS," discloses a device for locating and disabling a rogue access point by detecting the presence of a rogue wireless access point, instructing a special client to associate with the rogue access point and send a discover packet through the rogue access point to a network management device, locating the switch to which the rogue access point is connected, and disabling the switch port. The present invention does not instruct a special client to associate with a rogue access point and send a discover packet through the rogue access point to a network management device, locate the switch to which the rogue access point is connected, and disable the switch port as does U.S. Pat. Appl. No. 20060200862. U.S. Pat. Appl. No. 20060200862 is hereby incorporated by reference into the specification of the present invention.

SUMMARY OF THE INVENTION

It is an object of the present invention to secure a wireless local area network (WLAN).

It is an object of the present invention to detect and alert on unauthorized client Media Access Control (MAC) addresses, an unauthorized client actively trying to connect to a valid network, an authorized client actively trying to connect to an unauthorized access point (AP), an authorized client actively communicating with an unauthorized client in ad-hoc mode, a device broadcasting beacons for an ad-hoc network, two devices actively participating in an ad-hoc network, two devices actively participating in a bridged network, a device operating on the wrong channel, a violation in the broadcast Service Set Identifier (SSID) policy of the network, a violation in the encryption policy of the network, and a violation in the NULL SSID association policy of the network.

It is an object of the present invention to continuously and simultaneously monitor all 802.11 channels so that no packet goes undetected, determine the channel that a packet was transmitted on, versus the channel that it was received on, support intrusion detection at the full data rate of the physical channel without dropping packets, capture all frames, including frames with 802.11 protocol violations, such as those having the reserve type set, and detect and alert on frames having 802.11 protocol violations.

The present invention is a device for and method of detecting intrusion into a wireless network that includes a configuration file, a rules files, a main processor, a set packet processor, an initialize preprocessor, a parse rules file, an interface thread unit, a process packet unit, a decoder, a preprocess connected to the process packet unit; at least one preprocessor consisting of a rogue access point and transmit channel preprocessor, a NETSTUMBLER preprocessor, a MAC spoofing preprocessor, a DEAUTH flood preprocessor, an AUTH flood preprocessor, a rogue client preprocessor, a bridged network preprocessor, a rogue client valid access point preprocessor, valid client rogue access point preprocessor, an ad-hoc network preprocessor, a wrong channel preprocessor, a cloaking policy violation preprocessor, an encryption policy violation preprocessor, and a null SSID association policy violation preprocessor, and a detect unit.

DETAILED DESCRIPTION

The present invention is an intrusion detection method for a wireless computer. The present invention improves upon prior art wireless intrusion detection methods by adding additional preprocessors to detect and alert on activity which the prior art methods cannot.

The present invention continuously and simultaneously monitors packets transmitted on all wireless channels for malicious activity. In the preferred embodiment, the wireless channel is as defined in the IEEE Standards 802.11 et seq. However, the present invention applies to any suitable wireless channel. Simultaneously monitoring channels improves the ability to detect NETSTUMBLER and MAC spoofing, by ensuring that no packets on any channel are missed.

The present invention can detect and alert on unauthorized client MAC addresses, an unauthorized client attempting to connect to a valid network, an authorized device communicating with an unauthorized device, a device broadcasting beacons for an ad-hoc network, two devices participating in an ad-hoc network, two devices participating in a bridged network, a device operating on a wrong channel, a violation in the broadcast Service Set Identifier (SSID) policy of the network, a violation in the encryption policy of the network, and a violation in the NULL SSID association policy of the network.

The wireless intrusion detection system (WIDS) from AirDefense, Inc. cannot detect and alert on a policy violation for NULL SSID association, or on an authorized client communicating in ad-hoc mode with a rogue client as does the present invention. The AirDefense WIDS does not alert a user when one client in an ad-hoc conversation is an unauthorized user, as does the present invention. The AirDefense WIDS also cannot continuously and simultaneously monitor all wireless channels or support intrusion detection at the full data rate of the channel as does the present invention. In addition, the AirDefense WIDS drops frames with the reserve type set, unlike the present invention, which has the ability to capture all frames. Furthermore, the present invention detects and alerts on wireless protocol violations, whereas the AirDefense WIDS does not.

Figure 3:
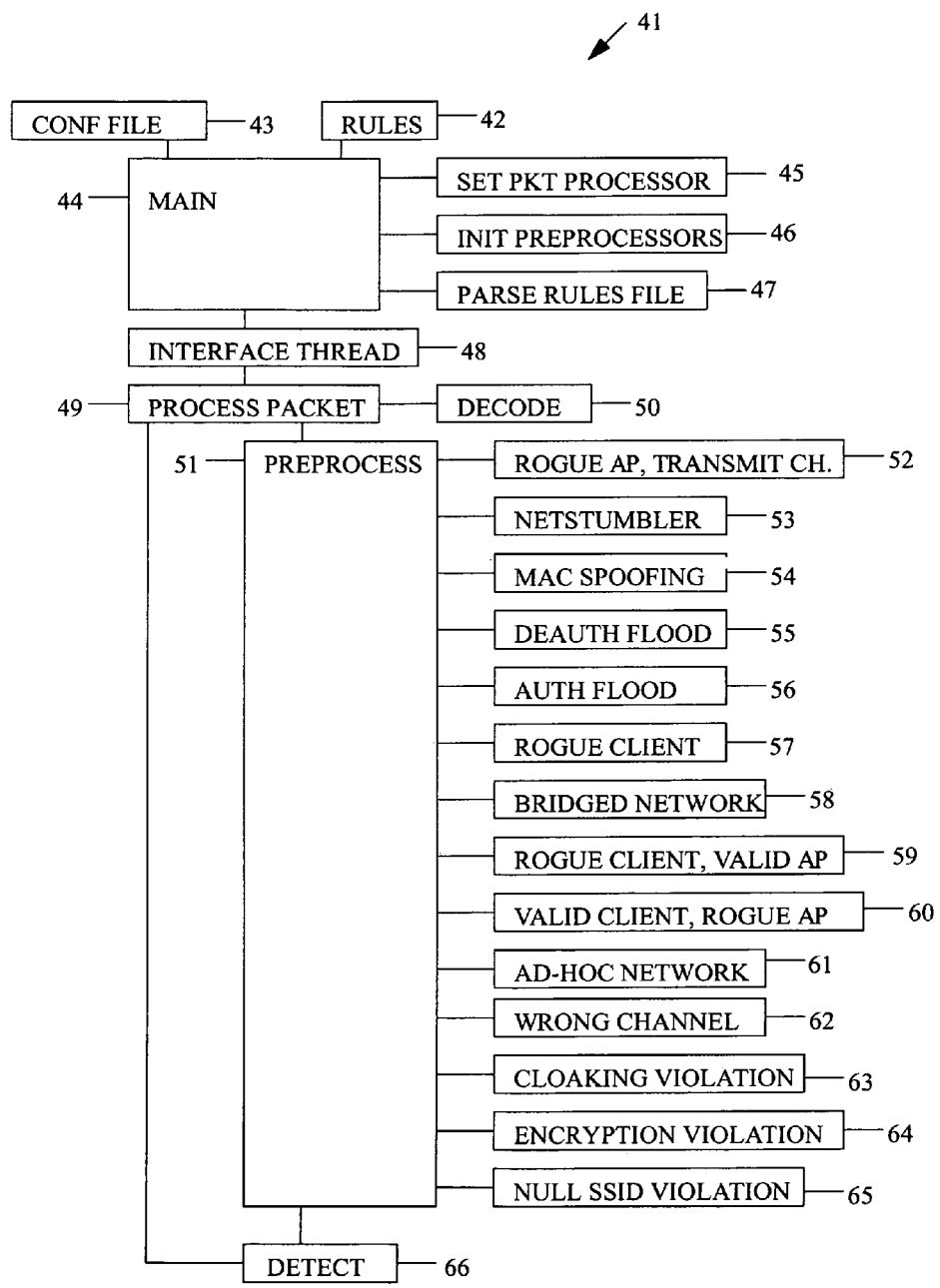
FIG. 3 is a schematic of the present invention.

FIG. 3 is a flowchart of the wireless intrusion detection device 41 of the present invention. The inputs to the device 41 are a rules file 42 and a configuration file 43 that contains arguments for the preprocessors 52-65. The function Main 24 calls the function SetPktProcessor 45, which determines which decoder function will process an incoming packet. Main 44 also calls InitPreprocessors 46 to initialize the preprocessors 52-65 and calls ParseRulesFile 47 to parse the rules file 42. Then, Main 44 calls InterfaceThread 48 to create one thread for all interfaces. The InterfaceThread 48 starts a loop that continuously reads all packets received from all interfaces or channels. The loop is handled by the function ProcessPacket 49. ProcessPacket 49 calls Decode 50 to decode the current packet. Once the packet has been decoded, ProcessPacket 49 calls Preprocess 51. Preprocess 51 sequentially calls the preprocessors 52-65 that detect and alert on the activity described below. Anytime an alert is generated by a preprocessor 52-65, the MAC address of the source transmitter is added to an alert list. Separate alert lists are maintained for each type of alert. Before a new alert is generated, each preprocessor checks it's alert list to see if the source MAC address is already on the list. If so, it means that an alert was previously generated for this source. Therefore, no new alert need be generated. This prevents the database from being flooded with multiple copies of the same alert for the same source. Once an alert is entered on an alert list, the source MAC address associated with the alert remains on the alert list until a user-definable period of time has elapsed. This timeout period is defined in the configuration file 43 and is passed to the preprocessors 52-56 along with all of the other policy parameters.

RogueAPTransmitChannel 52 preprocessor detects rogue access points (APs) and the channel on which a received packet is transmitted. RogueAPTransmitChannel 52 preprocessor is a new preprocessor that has not been disclosed by the prior art, the details of which are described below and in FIG. 4.

NETSTUMBLER 53 preprocessor detects devices running the NETSTUMBLER program for the purpose of wireless network discovery. In the preferred embodiment, the networks follow IEEE Standards 802.11b, 802.11a, and 802.11g. However, the present invention applies to any suitable wireless network. This preprocessor is known in the prior art (e.g., disclosed in wireless SNORT).

MACSpoofing 54 preprocessor detects modification, or spoofing, of a Media Access Control (MAC) address. This preprocessor is known in the prior art (e.g., disclosed in wireless SNORT).

DeauthFlood 55 preprocessor detects denial-of-service attacks that send a flood of deauthentication (DEAUTH) packets in an attempt to disrupt service. This preprocessor is known in the prior art (e.g., disclosed in wireless SNORT).

AuthFlood 56 preprocessor detects denial-of-service attacks that send a flood of Authentication (AUTH) packets in an attempt to disrupt service. This preprocessor is known in the prior art (e.g., disclosed in wireless SNORT).

RogueClient 57 preprocessor detects rogue clients. RogueClient 57 preprocessor is a new preprocessor who's operation has not been disclosed in the prior art, the details of which are described below and in FIG. 5.

BridgedNetwork 58 preprocessor detects the presence of a wireless distribution system, or bridged network. BridgedNetwork 58 preprocessor is a new preprocessor who's operation has not been disclosed in the prior art, the details of which are described below and in FIG. 6.

RogueClientValidAP 59 preprocessor detects an unauthorized client attempting to connect to a valid AP, or network. RogueClientValidAP 59 preprocessor is a new preprocessor who's operation has not been disclosed in the prior art, the details of which are described below and in FIG. 7.

ValidClientRogueAP 60 preprocessor detects an authorized client attempting to connect to a rogue AP. ValidClientRogueAP 60 preprocessor is a new preprocessor who's operation has not been disclosed in the prior art, the details of which are described below and in FIG. 8.

AdhocNetwork 61 preprocessor detects the presence of an ad-hoc network. AdhocNetwork 61 preprocessor is a new preprocessor who's operation has not been disclosed in the prior art, the details of which are described below and in FIG. 9.

WrongChannel 62 preprocessor detects a device operating on an unauthorized channel. Wrong Channel 62 preprocessor is a preprocessor who's operation has not been disclosed in the prior art, the details of which are described below and in FIG. 10.

CloakingViolation 63 preprocessor detects a device violating the network SSID cloaking policy. CloakingViolation 63 preprocessor is a preprocessor who's operation has not been disclosed in the prior art, the details of which are described below and in FIG. 11.

EncryptionViolation 64 preprocessor detects a device violating the network encryption policy. EncryptionViolation 64 preprocessor is a preprocessor who's operation has not been disclosed in the prior art, the details of which are described below and in FIG. 12.

NullSSIDViolation 65 preprocessor detects a device violating the network NULL SSID association policy. NullSSIDViolation 65 preprocessor is a preprocessor who's operation has not been disclosed in the prior art, the details of which are described below and in FIGS. 13-13D.

Preprocess 51 calls Detect 66, which applies the rules from the rules file 42 to the current packet. If a rule matches the current packet, an alert may be generated or the packet may be logged, depending on what is specified in the rules file 42. The rules file 42 detects suspicious or irregular behavior that could indicate intrusion, based on the values of certain fields in a single packet header. The preprocessors 52-65 are used to detect suspicious behavior based on information gained from many packets, or based on information gained from a single packet combined with input from the configuration file 43 and a more sophisticated detection algorithm.

Figure 4:
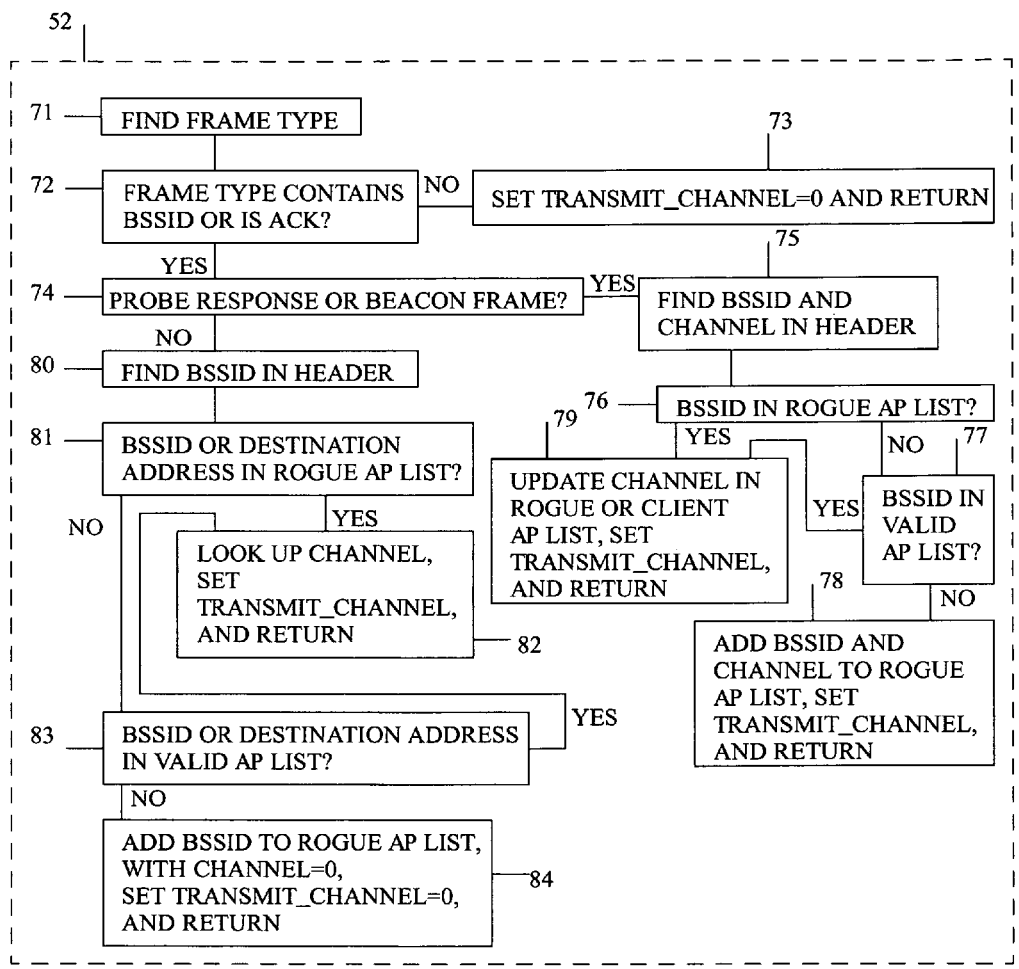
FIG. 4 is a flow-chart of the rogue access point and transmit channel preprocessor of the present invention.

FIG. 4 is a flow-chart of the RogueAPTransmitChannel 52 preprocessor that detects rogue access points (AP) and the transmit channel of a received packet. Due to spectral overlap, a packet transmitted on one channel may be received on that channel and many of its surrounding channels. RogueAPTransmitChannel 52 preprocessor determines on which channels a received packet was transmitted and received. The first step 71 of RogueAPTransmitChannel 52 preprocessor is determining the frame type of the packet being processed. The second step 72 is determining if the frame type contains a basic service set identifier (BSSID) or is an acknowledgement message (i.e., ACK). The BSSID is the MAC address of the AP that controls the network to which the source is associated. If the frame does not contain a BSSID and is not an ACK then the third step 73 is setting global variable Transmit_Channel equal to zero and returning to Preprocess 51. If the frame contains a BSSID or is an ACK then the fourth step 74 is determining if the packet is a beacon frame or a probe response. An access point advertises its operating channel in a beacon and probe response so that clients looking to associate with it will know which channel to use. The identification of the channel is included in one of the information elements in the headers of these two frame types. If either frame type is identified, the fifth step 75 is identifying the BSSID and the channel in the header. For any other frame type received, determine the BSSID. If the BSSID is known then the managing AP is known. Therefore, the channel on which it operates is known from its beacons and probe responses. Since the source address of the packet is managed by the AP, or possibly is that AP, the source address must be transmitting on the same channel as the AP. The sixth step 76 is determining if the BSSID is in a rogue AP list. If not then the seventh step 77 is determining if the BSSID is on a valid AP list. If the BSSID is not on the valid AP list then the eighth step 78 is adding the BSSID and its channel to the rogue AP list, setting global variable Transmit_Channel equal to that channel, and returning to Preprocess 51. If the BSSID is in the rogue AP list or the BSSID is not in the rogue AP list but is in the valid AP list then the ninth step 79 is updating the channel information in the corresponding rogue or valid AP list entry, setting global variable Transmit_Channel to that channel, and returning to Preprocess 51. If the frame is neither a beacon frame nor a probe response then the tenth step 80 is finding the BSSID in the header. The eleventh step 81 is determining if the BSSID or destination address is in the rogue AP list. An acknowledgement does not have a BSSID field in its header, it only has a destination address field. So, instead of trying to match the BSSID to an entry in the rogue AP list or the valid AP list, match the destination address to an entry in the rogue AP list or the valid AP list. The destination address will only be in one of these lists if the packet is destined for an AP. If the BSSID or the destination address are in the rogue AP list then the twelfth step 82 is determining its channel in the rogue AP list, setting global variable Transmit_Channel equal to that channel, and returning to Preprocess 51. If the BSSID and the destination address are not in the rogue AP list then the thirteenth step 83 is determining if the BSSID or destination address are on the valid AP list. If the BSSID or the destination address are in the valid AP list then determining its channel from the valid AP list, setting global variable Transmit_Channel to that channel, and returning to Preprocess 51. If the BSSID and the destination address are not on the valid AP list then the channel cannot be determined and the fourteenth step 84 is adding the BSSID to the rogue AP list with channel equal to zero, setting the global variable Transmit_Channel equal to zero, and returning to Preprocess 51.

For the occasions where an operating channel cannot be determined, a Transmit_Channel of zero is stored in the global packet data structure. This situation occurs with certain control frame types that do not contain a BSSID field and are not acknowledgements, such as broadcast probe requests. It also occurs when the captured packet is an acknowledgement that is not destined for an AP. Another situation where it occurs is when the captured frame is not a beacon or probe response, and it contains an unrecognized BSSID, meaning that a beacon or probe response has not previously been received from that AP. In such a case, the BSSID is also entered into the rogue AP list with an operating channel of zero. The channel is updated in the rogue AP list whenever the first beacon or probe response from that AP arrives. Otherwise, determine its channel, set global variable Transmit_Channel equal to that channel, and return to Preprocess 51.

Figure 1:
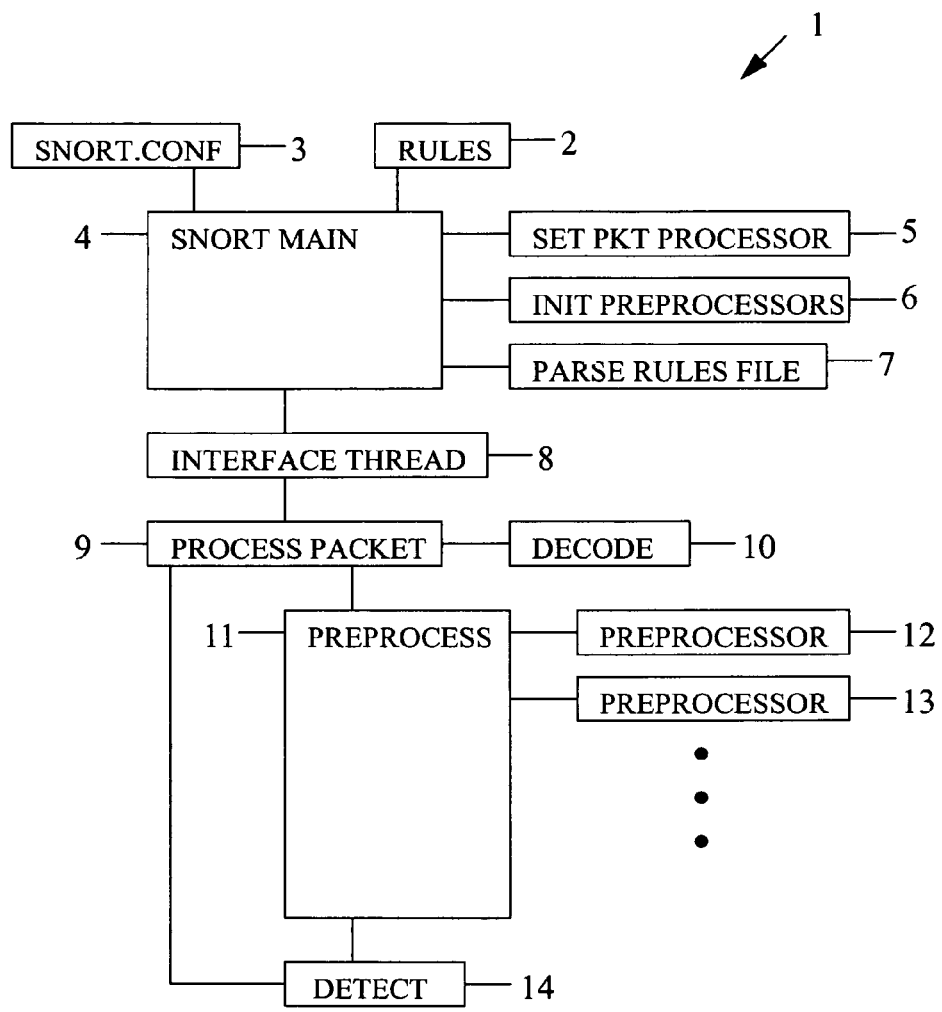
FIG. 1 is a flow-chart of the prior art SNORT method.
Figure 2:
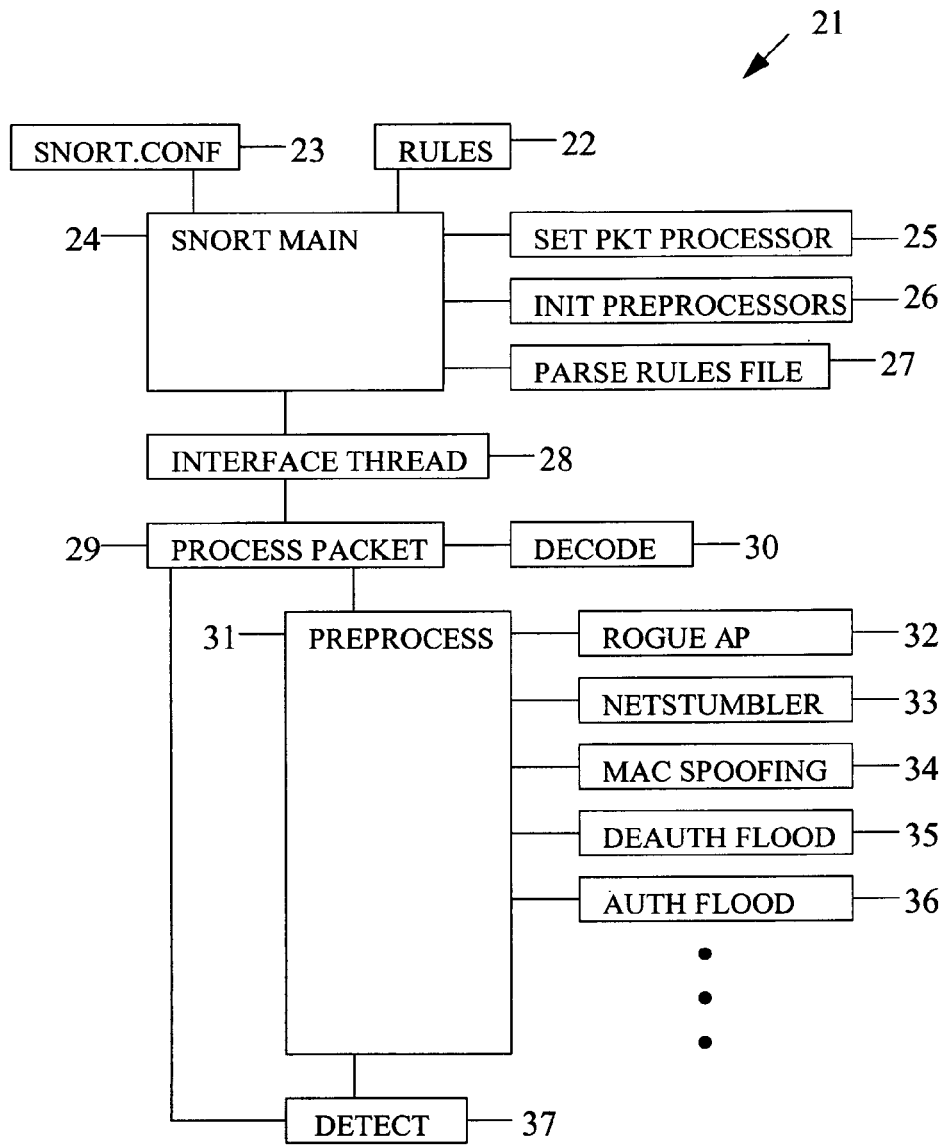
FIG. 2 is a flow-chart of the prior art wireless SNORT method.
Figure 5:
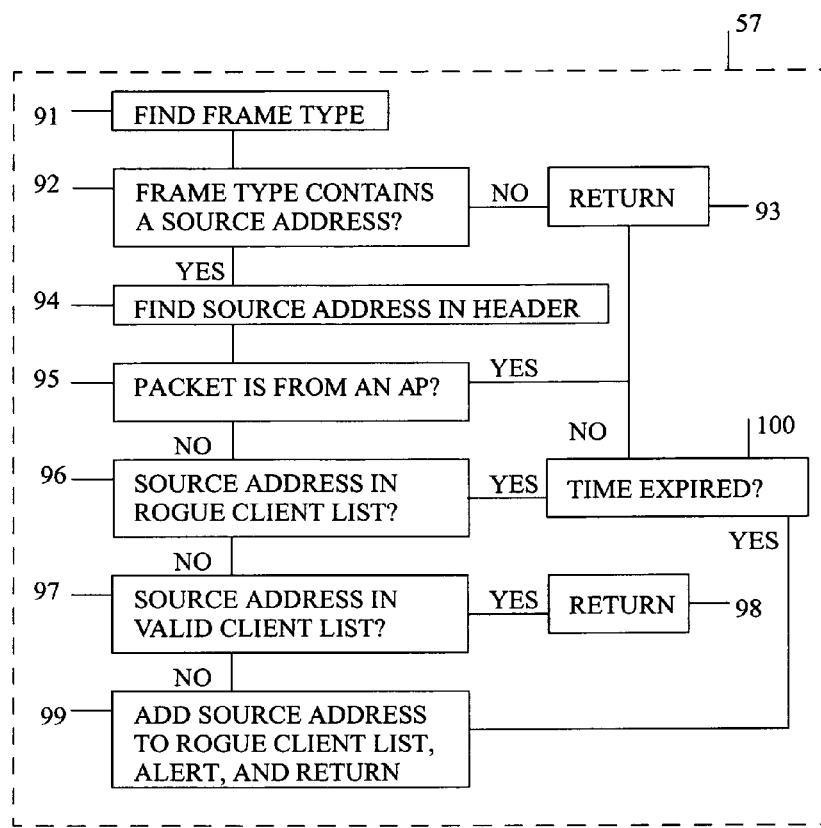
FIG. 5 is a flow-chart of the rogue client preprocessor of the present invention.

FIG. 5 is a flow-chart of the RogueClient 57 preprocessor that detects rogue clients. Wireless SNORT 21 in FIG. 2 includes a preprocessor to detect rogue access points 32, but does not include a preprocessor to detect rogue clients as does the present invention. The present detects and all unauthorized wireless transmitters. Valid clients are listed in the configuration file 43. If a client that is not on that list transmits a packet, an alert is generated. The first step 91 of the RogueClient 57 preprocessor is determining the frame type of the current packet being analyzed. The location of a source address, if any, in the wireless header is different for each frame type, so the frame type of the captured packet is determined before the source address can be discovered. The second step 92 is determining if the frame type contains a source address. If not then the third step 93 is returning to Preprocess 51. Some frame types, such as acknowledgements, do not contain source addresses. If the frame contains a source address then the fourth step 94 is finding the source address in the header. The fifth step 95 is determining if the packet is from an AP. If so then return to Preprocess 51. The sixth step 96 is determining if the source address is in the rogue client list. This is done by iterating through a list that is maintained of rogue clients. The RogueClient 57 preprocessor determines if the source address of the captured packet matches an entry in the rogue list. If the source address is not on the rogue client list then the seventh step 97 is determining if the source address is on a valid client list. This is done by iterating through the list of valid clients, looking to see if a member of the list matches the source address of the current packet. If so then the eighth step 98 is returning to Preprocessor 51. This indicates that the source is a valid client and need not cause an alert. If the packet is not on the valid client list then the ninth step 99 is adding the source address to the rogue client list, generating an alert message to indicate that a rogue client has been detected, and returning to Preprocessor 51. If the sixth step 96 determined that the source address is in the rogue client list then the tenth step 100 is determining if a user-defined time period has expired. If not then return to Preprocess 51. This indicates that the rogue client has already caused an alert and need not cause another one until the user-definable time period has elapsed. The timeout period is set in the configuration file 43. If the time period has expired then add the source address to the rogue client list, generate an alert message to indicate that a rogue client had been detected, and return to Preprocessor 51. This indicates that the source address of the current packet is not on the valid client list or the rogue client list Therefore, the packet originated from a rogue client but had not caused an alert. An alert is then generated, and the source address is added to the list of rogue clients.

Figure 6:
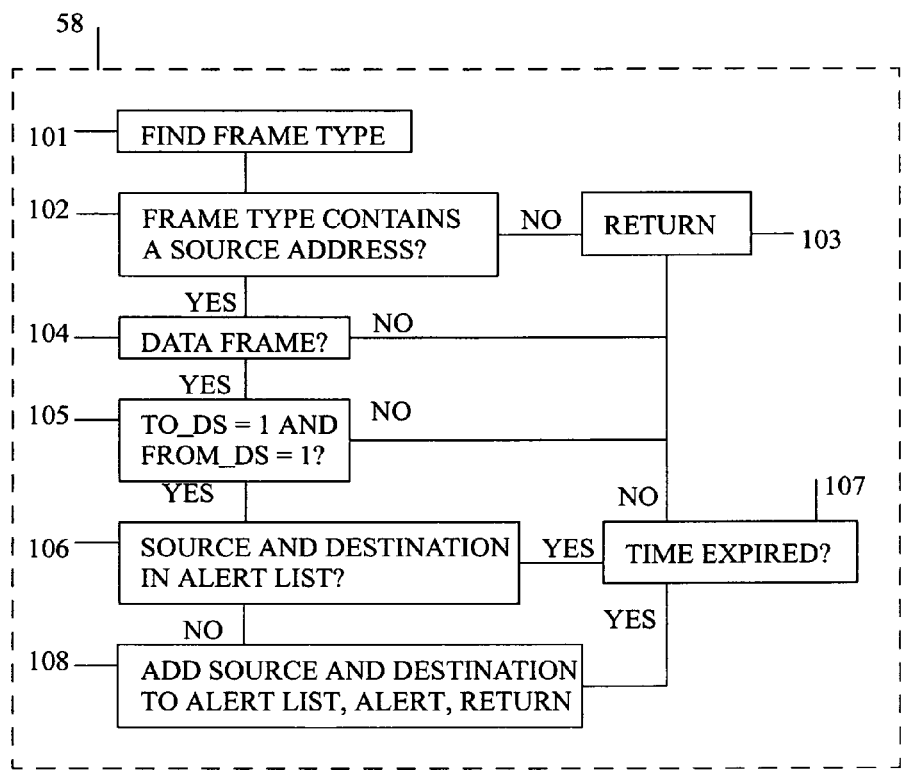
FIG. 6 is a flow-chart of the bridged network preprocessor of the present invention.

FIG. 6 is a flow-chart of the BridgedNetwork 58 preprocessor for detecting the presence of a wireless distribution system, or bridged network. The present invention detects when two or more devices participate in a bridged network. This is accomplished by determining if the packet being analyzed is a data packet. If so then the values of the to_ds and from_ds flags in the header are checked. The to_ds and from_ds flags indicate that the packet came from the distribution system (ds) and was being sent to the distribution system, respectively. If each flag value is equal to one, it means that the packet is being sent between two access points that form a wireless bridge. If a wireless bridge packet is identified, determine if an alert has already been issued for this source and destination couplet. If not, an alert is generated and the source and destination pair is added to the alert list. The first step 101 of the BridgedNetwork 58 preprocessor is finding the frame type of the packet being analyzed. The second step 102 is determining if the frame contains a source address. If not then the third step 103 is returning to Preprocess 51. If the frame contains a source address then the fourth step 104 is determining if the frame is a data frame. If so then the fifth step 105 is determining if to_ds and from_ds are each set to one. If the frame is not a data frame then return to Preprocess 51. If to_ds and from_ds are each set to one then the sixth step 106 is determining if the source and destination addresses are in the alert list. Otherwise, returning to Preprocess 51. If the source and destination addresses are on the alert list then the seventh step 107 is determining if a user-definable time has expired. If the time has not expired, indicating that the most recent previous alert of a bridged network is not stale, then return to Preprocessor 51. If either the time has expired, indicating that the previous alert is stale and should be refreshed, or if the source and destination addresses are not on the alert list then the eighth step 108 is adding the source and destination addresses to the alert list, generating an alert that indicates that a bridged network has been detected, and returning to Preprocess 51.

Figure 7:
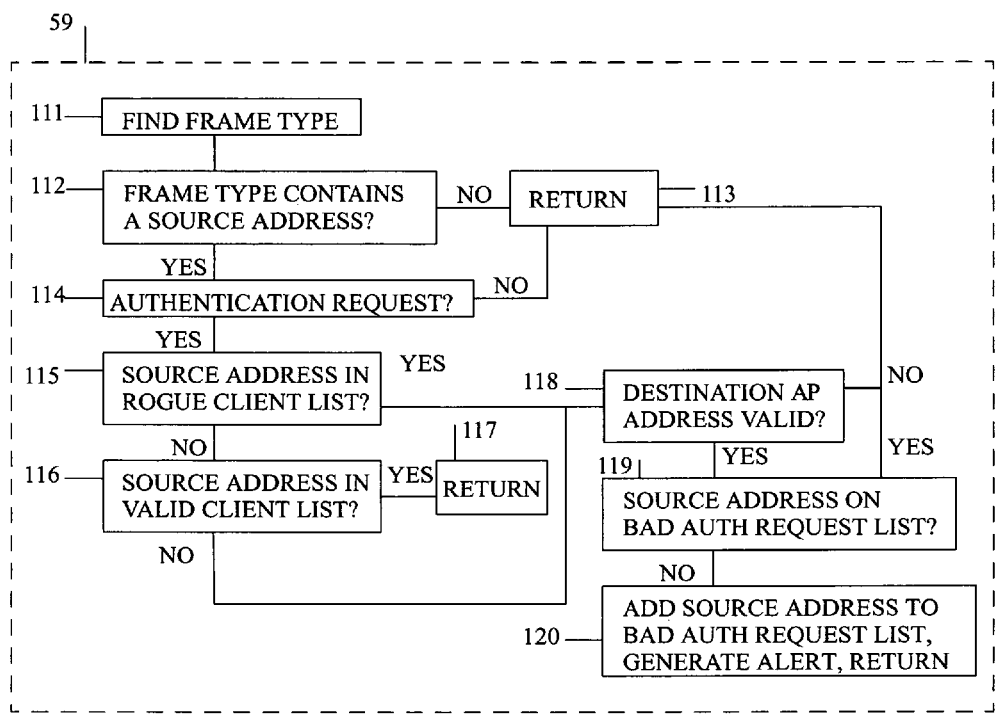
FIG. 7 is a flow-chart of the rogue client and valid access point preprocessor of the present invention.

FIG. 7 is a flow-chart of the RogueClientValidAP 59 preprocessor that detects an unauthorized client attempting to connect to a valid AP, or network. An unauthorized client attempting to connect to a valid network means a client that is not on the list of valid clients sends an authentication request to an access point that is on the list of valid access points. The RogueClientValidAP 59 preprocessor determines if the packet being analyzed is an authentication request. If so then the RogueClientValidAP 59 preprocessor records the destination access point. If the source address of the packet is determined to be rogue through the process described above (i.e., the source address is already on the rogue client list or it is not on the valid client list), the RogueClientValidAP 59 preprocessor iterates through the list of valid APs to determine if the destination AP is a valid AP for the network. Once it is established that the source address of the packet is not a valid client and its destination address is a valid AP, the RogueClientValidAP 59 preprocessor determines if an alert has already been issued on the source address. If not then the source address is added to the unauthorized authentication request alert list and an alert is generated. The first step 111 in the RogueClientValidAP 59 preprocessor is finding the frame type of the packet being analyzed. The second step 112 is determining if the frame contains a source address. If not then the third step 113 is returning to Preprocess 51. If the frame contains a source address then the fourth step 114 is determining if the frame is an authentication request. If so then the fifth step 115 is determining if the source address is on the rogue client list. Otherwise, returning to Preprocess 51. If the source address is not on the rogue client list then the sixth step 116 is determining if the source address is on the valid client list. If so then the seventh step 117 is returning to preprocess 51. If the source address is on the rogue client list or if the source address is not on the rogue client list or the valid client list then the eighth step 118 is determining if the destination AP address is valid. If not then return to Preprocess 51. If so then the ninth step 119 is determining if the source address is on the bad authentication request list. If so then return to preprocess 51. Otherwise, the tenth step 120 is adding the source address to the bad authentication request list, generating an alert to indicate that an unauthorized client is attempting to connect to a valid AP, and returning to Preprocess 51.

Figure 8:
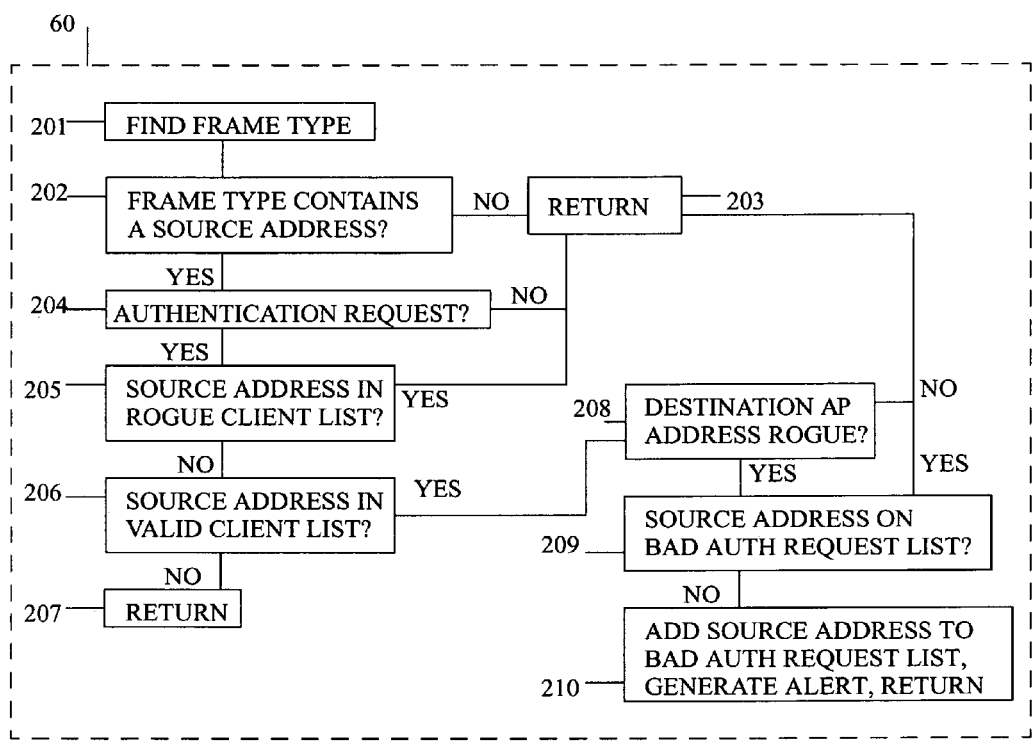
FIG. 8 is a flow-chart of the valid client and rogue access point preprocessor of the present invention.

FIG. 8 is a flow-chart of the ValidClientRogueAP 60 preprocessor that detects an authorized client attempting to connect to a rogue AP. If the packet being processed is an authentication request, the ValidClientRogueAP 60 preprocessor records the destination address of the packet. If the source address of the packet is on the valid client list, the ValidClientRogueAP 60 preprocessor iterates through the list of valid network APs. If the destination address is not on the list of valid network APs, the ValidClientRogueAP 60 preprocessor generates an alert. The first step 201 of the ValidClientRogueAP 60 preprocessor is determining the frame type of the packet. The second step 202 is determining if the frame contains a source address. If not then the third step 203 is returning to Preprocess 51. If so then the fourth step 204 is determining if the frame is an authentication request. If not then return to Preprocess 51. Otherwise, the fifth step 205 is determining if the source address is on the rogue client list. If so then return to Preprocess 51. Otherwise, the sixth step 206 is determining if the source address is on the valid client list. If not then the seventh step 207 is returning to Preprocess 51. If the source address is on the valid client list then the eighth step 208 is determining if the destination address is rogue. If not then return to Preprocess 51. Otherwise, the ninth step 209 is determining if the source address is on the bad authentication request list. If so then returning to Preprocess 51. Otherwise, adding the source address to the bad authentication request list, generating an alert to indicate that an authorized client is attempting to connect to a rogue AP, and returning to Preprocess 51.

Figure 9:
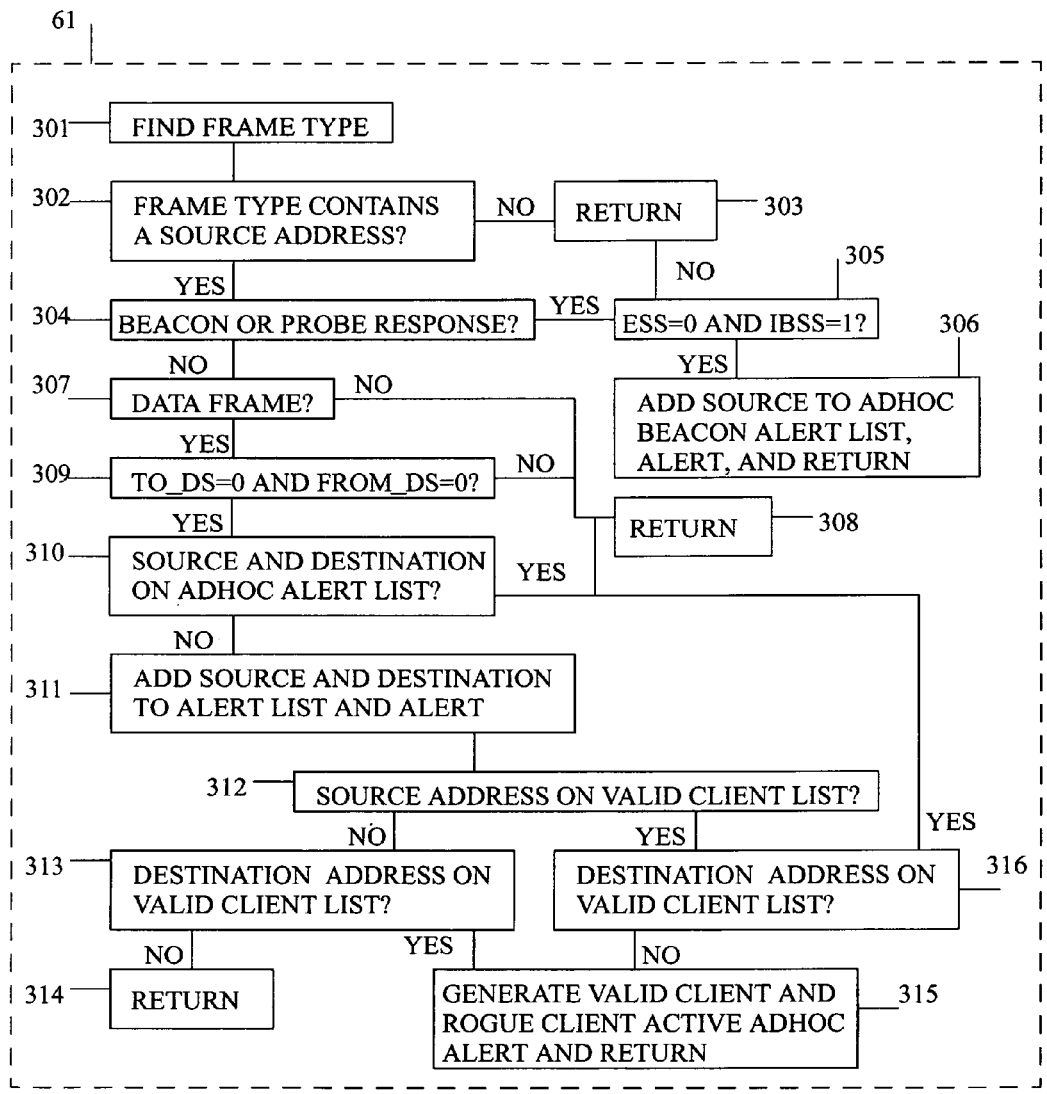
FIG. 9 is a flow-chart of the ad-hoc network preprocessor of the present invention.

FIG. 9 is a flow-chart of the AdhocNetwork 61 preprocessor for detecting ad-hoc networks. The AdhocNetwork 61 preprocessor has multiple alerts concerning ad-hoc networks. The AdhocNetwork 61 preprocessor detects a single device broadcasting beacons for an ad-hoc network, two devices participating in an ad-hoc network, and an authorized client communicating in ad-hoc mode with a rogue client. In order to detect a device sending ad-hoc beacons, the AdhocNetwork 61 preprocessor first checks to see if the packet being analyzed is a beacon frame or a probe response frame. If so then the AdhocNetwork 61 preprocessor checks the values of the ESS and IBSS fields in the header. A mobile station broadcasting beacons for an independent basic service set (IBSS), otherwise known as an ad-hoc network, always sets the extended service set (ESS) field to zero and the IBSS field to one. If these values are identified then an alert is generated. For the other two ad-hoc network scenarios, the AdhocNetwork 61 preprocessor first checks to see if the packet is a data packet. If so then it checks the values of the to_ds and from_ds flags in the header. If each field has a value of zero, it indicates that the packet is being transmitted directly between two clients in an ad-hoc network. At this point an active ad-hoc network alert is generated. If the source address is a valid client and the destination address is not, or the destination address is a valid client and the source address is not then an authorized client in active ad-hoc conversation with rogue client alert is generated. The first step 301 of the AdhocNetwork 61 preprocessor is determining the frame type of the packet. The second step 302 is determining if the frame contains a source address. If not then the third step 303 is returning to Preprocess 51. If so then the fourth step 304 is determining if the frame is a beacon or a probe response. If so then the fifth step 305 is determining if ESS is equal to zero and IBSS is equal to one. If not then return to Preprocess 51. If so then the sixth step 306 is adding the source address to the ad-hoc beacon alert list, generating an ad-hoc beacon detected alert, and returning to Preprocess 51. If the frame is neither a beacon nor a probe request then the seventh step 307 is determining if the frame is a data frame. If not then the eighth step 308 is returning to Preprocess 51. If so then the ninth step 309 is determining if to_ds and from_ds are each set to zero. If not then return to Preprocess 51. If so then the tenth step 310 is determining if the source and destination addresses are on the active ad-hoc alert list. If so then returning to Preprocess 51. If not then the eleventh step 311 is adding the source and destination addresses to the active ad-hoc network alert list and generating an active ad-hoc network detected alert. The twelfth step 312 is determining if the source address is on the valid client list. If not then the thirteenth step 313 is determining if the destination address is on the valid client list. If not then the fourteenth step 314 is returning to Preprocess 51. If so then the fifteenth step 315 is generating an authorized client in ad-hoc conversation with rogue client alert, and returning to Preprocess 51. If the source address is on the valid client list then the sixteenth step 316 is determining if the destination address is on the valid client list. If so then returning to Preprocess 51. If not then generating an authorized client in ad-hoc conversation with rogue client alert, and returning to Preprocess 51.

Figure 10:
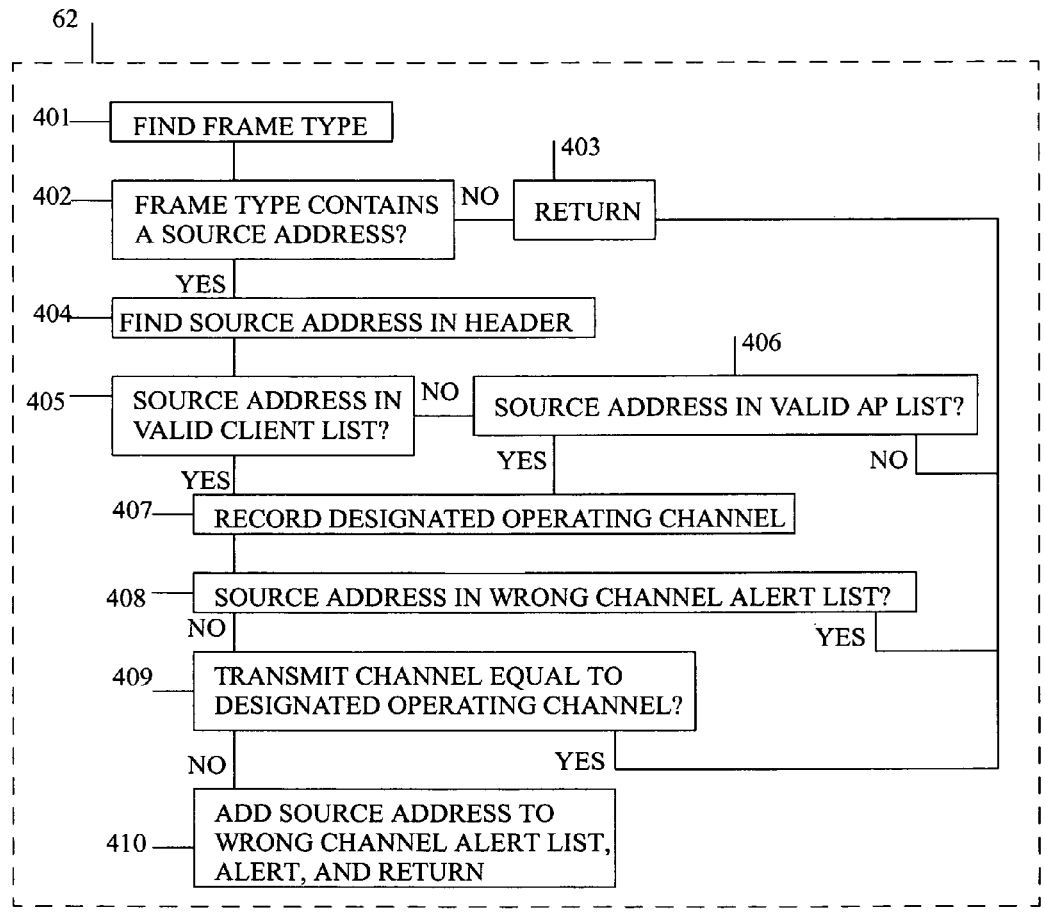
FIG. 10 is a flow-chart of the wrong channel preprocessor of the present invention.

FIG. 10 is a flow-chart of the WrongChannel 62 preprocessor for detecting a device operating on an unauthorized channel. Valid access points (APs) and their authorized operating channels are listed in the configuration file 43. The network's valid clients and their authorized operating channels are also listed in the configuration file 43. The WrongChannel 62 preprocessor detects a device operating on an unauthorized channel. The WrongChannel 62 preprocessor determines if the source address of a packet is an authorized access point listed in the configuration file 43 or an authorized client listed in the configuration file 43. The WrongChannel 62 preprocessor looks up the authorized operating channel for the valid client or access point and compares it against the channel on which the packet was transmitted. If they match, there is no violation. If the transmit channel and the authorized operating channel are different then the source is transmitting packets on an unauthorized channel. This would be a violation for which an alert would be generated. The first step 401 of the WrongChannel 62 preprocessor is determining the frame type of the packet being analyzed. The second step 402 is determining if the frame contains a source address. If not then the third step 403 is returning to the Preprocessor 51. If so then the fourth step 404 is determining the source address in the header. The fifth step 405 is determining if the source address is in the valid client list. If not then the sixth step 406 is determining if the source address is in the valid AP list. If not then returning to Preprocess 51. If the source address is in the valid client list or not in the valid client list but in the valid AP list then the seventh step 407 is recording the designated operating channel. The eighth step 408 is determining if the source address is in the wrong channel alert list. If so then return to Preprocess 51. If not then the ninth step 409 is determining if the transmit channel is the designated operating channel. If so then return to Preprocess 51. If not then the tenth step 410 is adding the source address to the wrong channel alert list, generating a device operating on the wrong channel alert, and returning to Preprocess 51.

Figure 11:
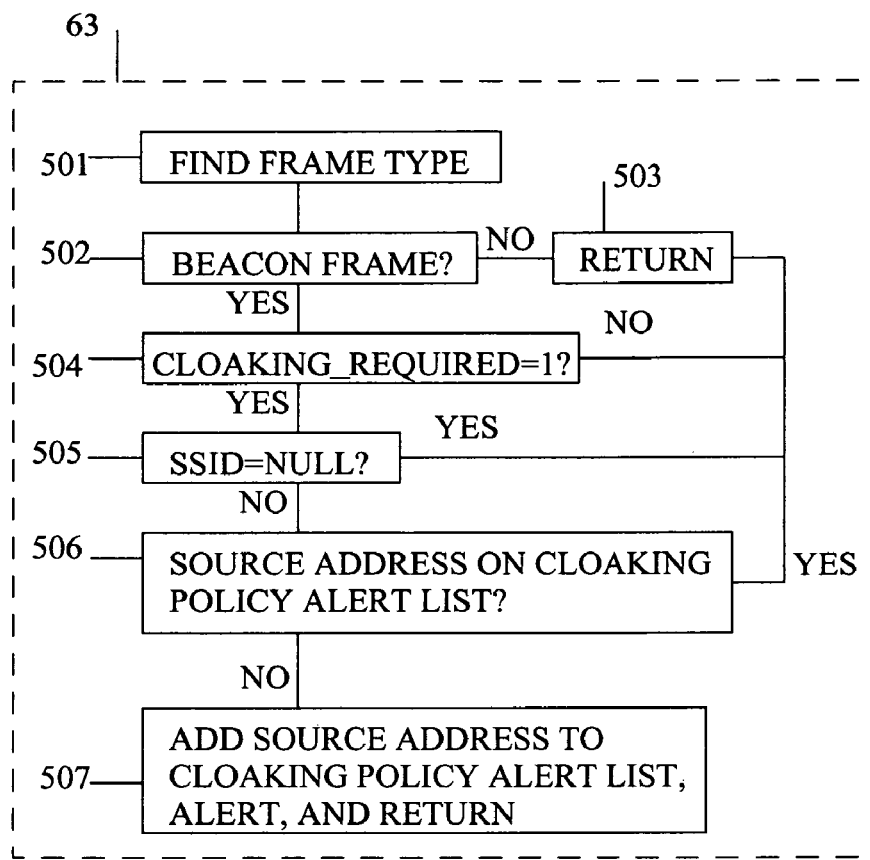
FIG. 11 is a flow-chart of the cloaking violation preprocessor of the present invention.

FIG. 11 is a flow-chart of the Cloaking Violation 63 preprocessor that detects a device violating the network SSID cloaking policy. In some access points (APs), the administrator can choose to "cloak" the AP's service set identification (SSID) so that the AP does not transmit the SSID in the beacon frame. The informational element containing the SSID will still appear in the frame, but it will contain a null value in place of the SSID string. The network cloaking policy is set in the configuration file 43 with a Boolean variable cloaking_required. If this variable is a one, the AP must cloak the SSID in the beacon frames that it transmits. If this variable is a zero, the AP does not have to cloak the SSID in the beacon frames it transmits. CloakingViolation 63 preprocessor determines whether or not the received packet is a beacon frame. If it is, it determines whether or not the SSID field is NULL. If cloaking is required in the network (cloaking_required=1) and the SSID field is not equal to NULL, an alert is generated. The first step 501 of the CloakingViolation 63 preprocessor is determining the frame type of the packet being analyzed. The second step 502 is determining if the frame is a beacon. If not then the third step 503 is returning to Preprocess 51. If so then the fourth step 504 is determining if cloaking_required is, equal to a one. If not then return to Preprocess 51. If so then the fifth step 505 is determining if SSID is null. If so then returning to Preprocess 51. If not then the sixth step 506 is determining if the source address of the packet is on the cloaking policy alert list. If so then returning to Preprocess 51. If not then the seventh step 507 is adding the source address to the cloaking policy alert list, generating a SSID cloaking policy violation detected alert, and returning to Preprocess 51.

Figure 12:
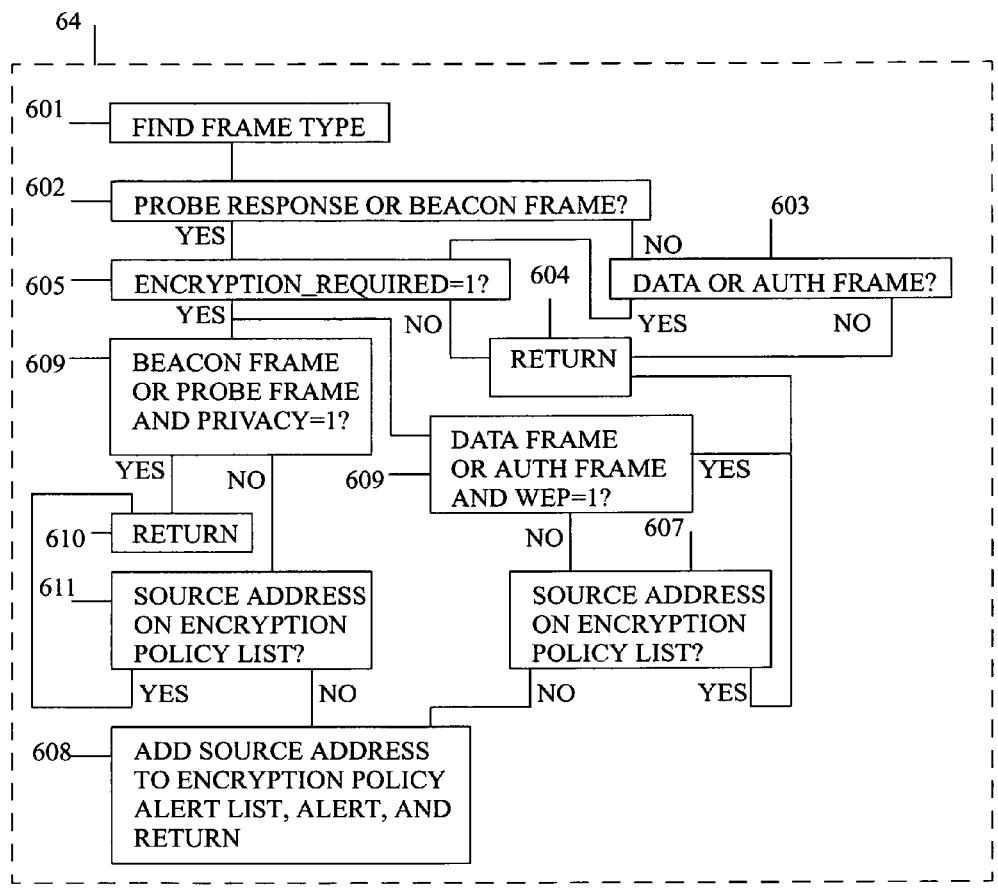
FIG. 12 is a flow-chart of the encryption violation preprocessor of the present invention.

FIG. 12 is a flow-chart of the EncryptionViolation 64 preprocessor for detecting a device violating the network encryption policy. The administrator can configure the network to operate with or without encryption. The EncryptionViolation 64 preprocessor can detect if a particular client is not adhering to the encryption policy. The system administrator sets the network encryption policy in the configuration file 43 with a Boolean variable encryption_required. If this variable is a one, encryption is required for transmissions. If this variable is a zero, encryption is not required for transmissions. The EncryptionViolation 64 preprocessor determines if the packet being analyzed is a data packet or an authentication packet. If it is either of these frame types, the EncryptionViolation 64 preprocessor checks the value of the Wired Equivalent Privacy (wep) flag in the header. The wep flag should have the value one if the packet payload is encrypted. If encryption is required for transmission (encryption_required=1) and the value of the wep flag is zero, an alert is generated. The EncryptionViolation 64 preprocessor also determines if the packet is a beacon or a probe response. If either of these frame types is recognized, the EncryptionViolation 64 preprocessor determines the value of the privacy field in the header. The privacy field should be one if the access point requires encrypted transmissions. If encryption is required for transmission and the value of the privacy field in the beacon or probe response frames is zero, an alert is generated. The different frame types must be treated differently in the EncryptionViolation 64 preprocessor because beacons and probe responses are never encrypted, but they must still adhere to the encryption policy by broadcasting whichever option the system administrator has selected for the network. To detect a violation of the encryption policy, the EncryptionViolation 64 preprocessor determines the value of the privacy field in beacons and probe responses, and determines the value of the wep field in data packets. If the privacy field is set to a one in the header of a beacon or probe response frame, it indicates that the AP implements the wep algorithm, and that all clients must use wep encryption when transmitting data frames. If the wep field in the header of a data packet is a one, it means that the packet payload is encrypted using the wep algorithm. Checking the privacy field would detect access point (AP) encryption policy violators, and checking the wep field would detect client encryption policy violators. The EncryptionViolation 64 preprocessor checks both fields, whereas prior art wireless intrusion detection systems do not. The first step 601 of the EncryptionViolation 64 preprocessor is determining the frame type of the packet being analyzed. The second step 602 is determining if the frame is a probe response or a beacon frame. If it is neither then the third step 603 is determining if the frame is a data frame or an authentication frame. If the frame is neither then the fourth step 604 is returning to Preprocess 51. If the frame is a probe response, beacon frame, data frame, or authentication frame then the fifth step 605 is determining if encryption_required is set to a one. If not then return to preprocess 51. If so and the frame is a Data or Authentication frame then the sixth step 606 is determining if wep is a one. If so then return to Preprocess 51. If not then the seventh step 607 is determining if the source address of the packet is on the encryption policy list. If so then return to Preprocess 51. If not then the eighth step 608 is adding the source address to the encryption policy alert list, generating an encryption policy violation detection alert, and returning to Preprocess 51. If encryption_required is set to a one and the frame is a Beacon or Probe response frame then the ninth step 609 is determining if the privacy field is a one. If so then the tenth step 610 is returning to Preprocess 51. If not then the eleventh step 611 is determining if the source address is on the encryption policy list. If so then return to Preprocess 51. If not then add the source address to the encryption policy alert list, generate an encryption policy violation detection alert, and return to Preprocess 51.

Figure 13:
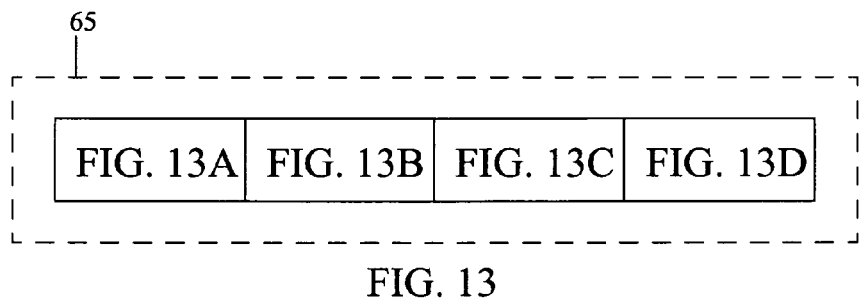
FIG. 13 is a flow-chart of the null SSID violation preprocessor of the present invention.

FIG. 13 is a flow-chart of the NullSSIDViolation 65 preprocessor for detecting a device violating the network NULL SSID association policy. FIG. 13 consists of FIGS. 13A, 13B, 13C, and 13D. An adversary attempting to locate APs with cloaked SSIDs can configure their client to send out network probe requests using a null or broadcast SSID in the probe. Upon receiving a broadcast probe request from a client, the AP will send a probe response containing the SSID and allow the client to associate. The AP should be configured to not respond to, or associate with, clients sending probe requests that contain a broadcast SSID. The present invention detects when an AP is violating the null SSID association policy. The network NULL SSID association policy is set in the configuration file 43 with the variable null_ssid_assoc. If this variable is set to a one, the access point is allowed to respond to broadcast probe requests and associate with clients who send broadcast association requests. If this variable is set to a zero, the access point is not allowed to respond to broadcast probe requests or broadcast association requests. NullSSIDViolation 65 preprocessor determines if a packet is a probe request or an association request. If either of these frame types is identified, the NullSSIDViolation 65 preprocessor determines if the SSID field in the header is NULL. If so, the source is added to a "bad list" of clients sending probe requests with a NULL SSID, or a list of clients sending association requests with a NULL SSID (two separate lists are maintained). The NullSSIDViolation 65 preprocessor also determines if the packet is a probe response or an association response. If one of these frame types is identified, the NullSSIDViolation 65 preprocessor cycles through the corresponding "bad list" and compares the source addresses in the "bad list" to the destination addresses of the probe response or association response. If there is a match, it means that an access point is sending a probe response or an association response to a client that previously sent a NULL SSID probe request or association request. If the network policy is that NULL SSID association is not allowed (null_ssid_assoc=0) and there is a match, an alert is generated.

Figure 13A:
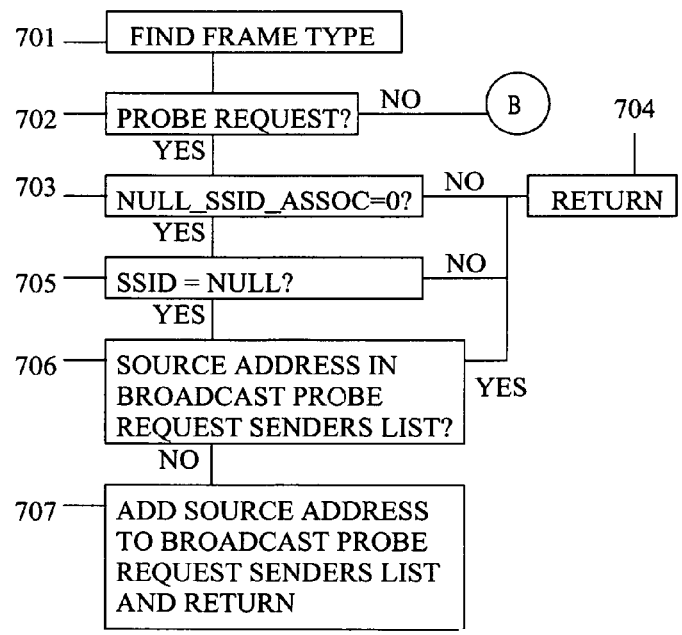
FIG. 13A is a flow-chart of a first section of the null SSID violation preprocessor of FIG. 13.

The first step 701 in FIG. 13A is determining the frame type of the packet being analyzed. The second step 702 is determining if the frame is a probe request. If not then proceed to the first step 711 in FIG. 13B. If so then the third step 703 in FIG. 13A is determining if null_ssid_assoc is set to a zero. If not then the fourth step 704 is returning to Preprocess 51. If so then the fifth step 705 is determining if SSID is null. If not then return to Preprocess 51. If SSID is set to null then the sixth step 706 is determining if the source address of the packet is in the broadcast probe request senders list. If so then return to Preprocess 51. If not then the seventh step 707 is adding the source address to the broadcast probe request senders list and returning to Preprocess 51.

Figure 13B:
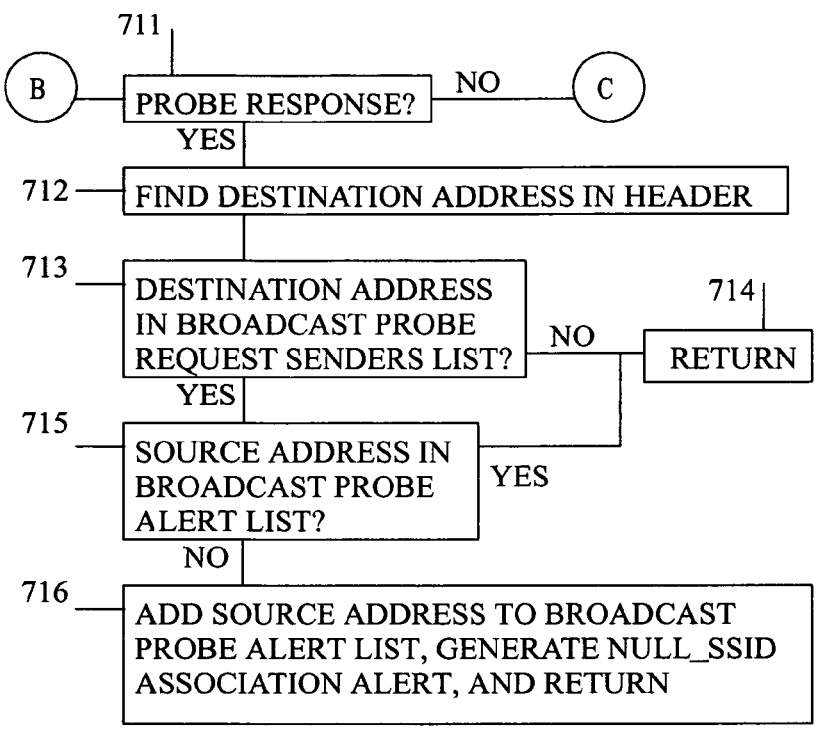
FIG. 13B is a flow-chart of a second section of the null SSID violation preprocessor of FIG. 13.

The first step 711 of FIG. 13B is determining if the frame is a probe response. If not then proceed to the first step 721 of FIG. 13C. If the frame is a probe response then the second step 712 of FIG. 13B is determining the destination address in the header. The third step 713 is determining if the destination address is in the broadcast probe request senders list. If not then the fourth step 714 is returning to Preprocess 51. If the destination address is on the broadcast probe request senders list then the fifth step 715 is determining if the source address is on the broadcast probe alert list. If so then return to Preprocess 51. If not then the sixth step 716 is adding the source address to the broadcast probe alert list, generating a Null SSID Association alert, and returning to Preprocess 51.

Figure 13C:
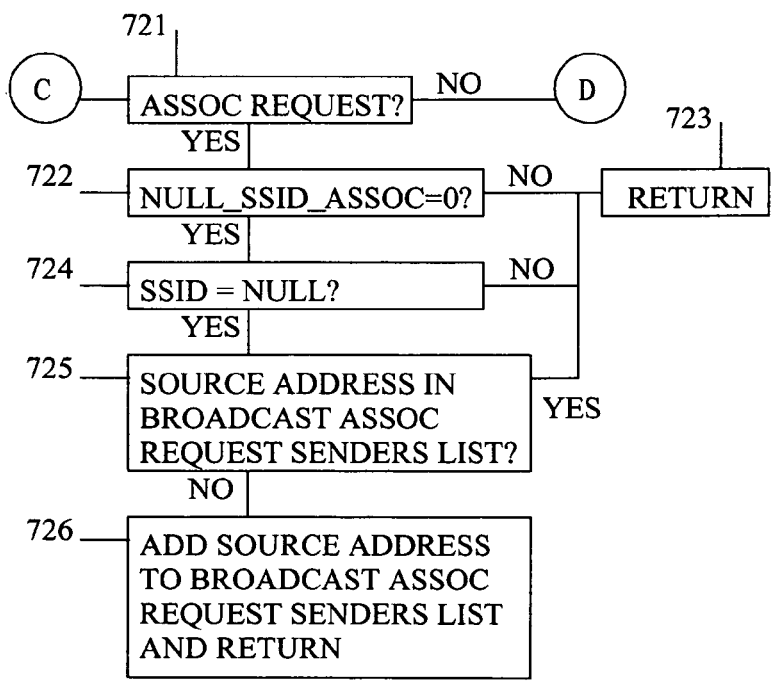
FIG. 13C is a flow-chart of a third section of the null SSID violation preprocessor of FIG. 13.

The first step 721 of FIG. 13C is determining if the frame is an association request. If not then proceed to the first step 731 of FIG. 13D. If so then the second step 722 of FIG. 13C is determining if null_ssid_assoc is set to a zero. If not then the third step 723 is returning to Preprocess 51. If so then the fourth step 724 is determining if SSID is set to null. If not then return to Preprocess 51. If so then the fifth step 725 is determining if the source address is on the broadcast association request senders list. If so then return to Preprocess 51. If not then the sixth step 726 is adding the source address to the broadcast association request senders list, and returning to Preprocess 51.

Figure 13D:
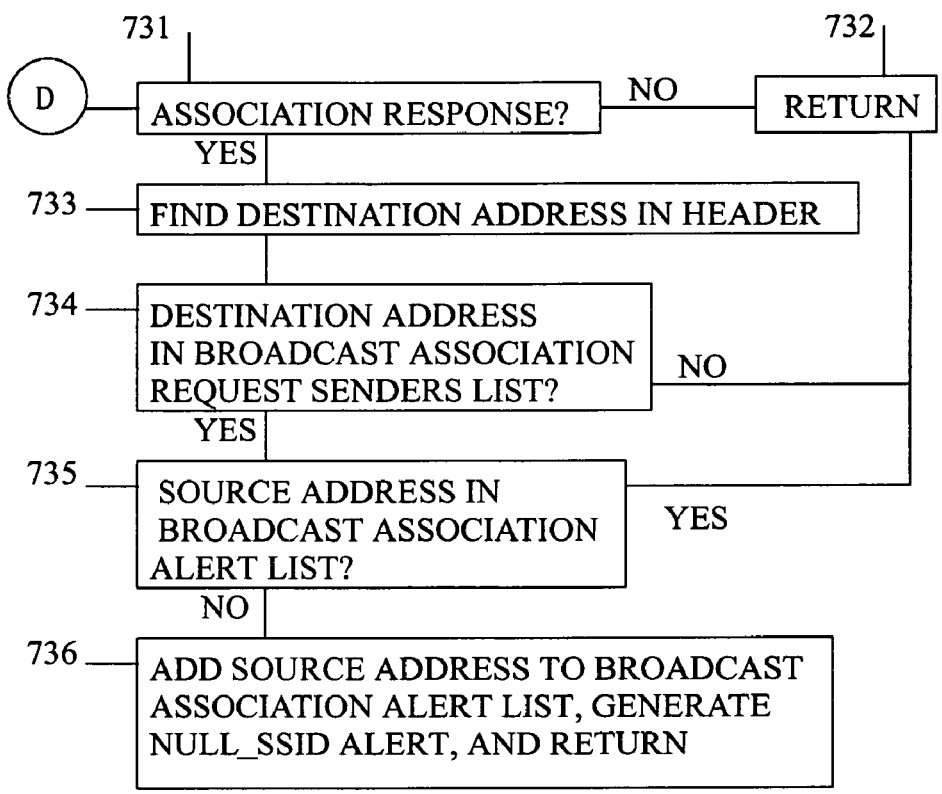
FIG. 13D is a flow-chart of a fourth section of the null SSID violation preprocessor of FIG. 13.

The first step 731 of FIG. 13D is determining if the frame is an association response. If not then the second step 732 is returning to Preprocess 51. If so then the third step of 733 is determining the destination address in the header. The fourth step 734 is determining if the destination address is on the broadcast association request senders list. If not then return to Preprocess 51. If so then the fifth step 735 is determining if the source address is on the broadcast association alert list. If so then return to Preprocess 51. If not then the sixth step 736 is adding the source address to the broadcast association alert list, generating a Null SSID Association alert, and returning to Preprocess 51.

What is claimed is:

1. A device for detecting intrusion into a wireless network, comprising:
 a) a configuration file unit;
 b) a rules files unit;
 c) a main processing unit connected to the configuration files unit and rules file unit;
 d) a set packet preprocessor unit connected to the main processing unit;
 e) an initialize preprocessors unit connected to the main processing unit;
 f) a parse rules file unit connected to the main processing unit;
 g) an interface thread unit connected to the main processing unit;
 h) a process packet unit connected to the interface thread unit;
 i) a decode unit connected to the process packet unit;
 j) a preprocess unit connected to the process packet unit;
 k) a plurality of preprocessors connected to the preprocess unit, including a rogue access point and transmit channel preprocessor, a NETSTUMBLER preprocessor, a MAC spoofing preprocessor, a DEAUTH flood preprocessor, an AUTH flood preprocessor, a rogue client preprocessor, a bridged network preprocessor, a rogue client valid access point preprocessor, valid client rogue access point preprocessor, an ad-hoc network preprocessor, a wrong channel preprocessor, a cloaking violation preprocessor, an encryption violation preprocessor, and a null SSID violation preprocessor; and
 l) a detect unit connected to the preprocess unit and the process packet unit.

2. A method of simultaneous intrusion detection on a plurality of computer communications, comprising:
 a) initializing on a computing device a configuration file;
 b) initializing on the computing device a rules files;
 c) controlling on the computing device the intrusion detection method using a main processor;
 d) setting on the computing device packet preprocessors;
 e) initializing on the computing device preprocessors;
 f) parsing on the computing device the rules file;
 g) creating on the computing device an interface thread that include all packets transmitted on all channels;
 h) processing on the computing device the packets by decoding the packets and preprocessing on the computing device the packets using a plurality of preprocessors, including a rogue access point and transmit channel preprocessor, a NETSTUMBLBR preprocessor, a MAC spoofing preprocessor, a DEAUTH flood preprocessor, an AUTH flood preprocessor, a rogue client preprocessor, a bridged network preprocessor, a rogue client valid access point preprocessor, valid client rogue access point preprocessor, an ad-hoc network preprocessor, a wrong channel preprocessor, a cloaking violation preprocessor, an encryption violation preprocessor, and a null SSID violation preprocessor; and
 i) detecting on the computing device intrusion based on the results of the last step.

3. The method of claim 2, wherein the step of preprocessing on the computing device a packet using a rogue access point and transmit channel preprocessor is comprised of the steps of:
 a) determining on the computing device a frame type of the packet;
 b) determining on the computing device if the frame type contains a basic service set identifier (BSSID) or is an acknowledgement message (ACK);
 c) if the frame does not contain a BSSID and is not an ACK then setting on the computing device global variable Transmit_Channel equal to zero and returning to step (h) in claim 2;
 d) if the frame contains a BSSID or is an ACK then determining on the computing device if the packet is a beacon frame or a probe response;
 e) if either frame type is identified then identifying on the computing device the BSSID and the channel in its header;
 f) determining on the computing device if the BSSID is in a rogue AP list;
 g) if the BSSID is not in the rogue AP list then determining on the computing device if the BSSID is on a valid AP list;
 h) if the BSSID is not on the valid AP list then adding on the computing device the BSSID and its channel to the rogue AP list, setting on the computing device global variable Transmit_Channel equal to the BSSID channel, and returning to step (h) in claim 2;
 i) if the BSSID is in the rogue AP list or the BSSID is not in the rogue AP list but is in the valid AP list then updating on the computing device the channel information in the corresponding rogue and valid AP list entry, setting on the computing device global variable Transmit_Channel equal to the BSSID channel, and returning to step (h) in claim 2;

j) if the frame is neither a beacon frame nor a probe response then finding on the computing device the BSSID in the header;

k) determining on the computing device if the BSSID or destination address is in a rogue AP list;

l) if the BSSID or the destination address are in the rogue AP list then determining on the computing device its channel in the rogue AP list, setting on the computing device global variable Transmit_Channel equal to the BSSID channel, and returning to step (h) in claim 2;

m) if the BSSID and the destination address are not in the rogue AP list then determining on the computing device if the BSSID or destination address are on the valid AP list;

n) if the BSSID and the destination address are on the valid AP list then determining on the computing device the BSSID channel in the valid AP list, setting on the computing device the global variable Transmit_Channel equal to the BSSID channel, and returning to step (h) in claim 2; and o) if the BSSID and the destination address are not on the valid AP list then adding on the computing device the BSSID to the rogue AP list with channel equal to zero, setting on the computing device the global variable Transmit_Channel equal to zero, and returning to step (h) in claim 2.

4. The method of claim 2, wherein the step of preprocessing on the computing device a packet using a rogue client preprocessor is comprised of the steps of:

a) determining on the computing device a frame type of the packet;

b) determining on the computing device if the frame type contains a source address;

c) if the frame type does not contain a source address then returning to step (h) in claim 2;

d) if the frame contains a source address then finding on the computing device the source address in its header;

e) determining on the computing device if the packet is from an access point;

f) if the packet is from an access point then returning to step (h) in claim 2;

g) determining on the computing device if the source address is in a rogue client list;

h) if the source address is not on the rogue client list then determining on the computing device if the source address is on a valid client list;

i) if the source address is on the valid client list then returning to step (h) in claim 2;

j) if the packet is not on the valid client list then adding on the computing device the source address to the rogue client list, generating on the computing device an alert message to indicate that a rogue client has been detected, and returning to step (h) in claim 2;

k) if the source address is on the rogue client list then determining on the computing device if a user-defined time period has expired;

l) if the user-definable time-period has not expired then returning to step (h) in claim 2; and m) if the user-definable time-period has expired then adding on the computing device the source address to the rogue client list, generating on the computing device an alert message to indicate that a rogue client had been detected, and returning to step (h) in claim 2.

5. The method of claim 2, wherein the step of preprocessing on the computing device a packet using a bridged network preprocessor is comprised of the steps of:

a) finding on the computing device a frame type of the packet;

b) determining on the computing device if the frame contains a source address;

c) if the frame type does not contain a source address then returning to step (h) in claim 2;

d) if the frame contains a source address then determining on the computing device if the frame is a data frame;

e) if the frame is not a data frame then returning to step (h) in claim 2;

f) if the frame is a data frame then determining on the computing device if to_ds and from_ds are each set to one;

g) if to_ds and from_ds are not both set to one then returning to step (h) in claim 2;

h) if to_ds and from_ds are each set to one then determining on the computing device if the source and destination addresses are on an alert list;

I) if the source and destination addresses are on the alert list then determining on the computing device if a user-definable time-period has expired;

j) if the user-definable time-period has not expired then returning to step (h) in claim 2; and k) if either the user-definable time-period has expired or if the source and destination addresses are not on the alert list then adding on the computing device the source and destination addresses to the alert list, generating on the computing device an alert that indicates that a bridged network has been detected, and returning to step (h) in claim 2.

6. The method of claim 2, wherein the step of preprocessing on the computing device a packet using a rogue client valid access point preprocessor is comprised of the steps of:

a) finding on the computing device a frame type of the packet;

b) determining on the computing device if the frame contains a source address;

c) if the frame does not contain a source address then returning to step (h) in claim 2;

d) if the frame contains a source address then determining on the computing device if the frame is an authentication request;

e) if the frame is an authentication request then determining on the computing device if the source address is on a rogue client list;

f) if the frame is not an authentication request then returning to step (h) in claim 2;

g) if the source address is not on the rogue client list then determining on the computing device if the source address is on the valid client list;

h) if the source address is on the valid client list then returning to step (h) in claim 2;

i) if the source address is either on the rogue client list or not on the rogue client list or the valid client list then determining on the computing device if the destination access point address is valid;

j) if the destination access point address is not valid then returning to step (h) in claim 2;

k) if the destination access point address is valid then determining on the computing device if the source address is on a bad authentication request list;

l) if the source address is on the bad authentication request list then returning to step (h) in claim 2; and m) if the source address is not on the bad authentication request list then adding on the computing device the source address to the bad authentication request list, generating on the computing device an alert to indicate that an unauthorized client is attempting to connect to a valid access point, and returning to step (h) in claim 2.

7. The method of claim 2, wherein the step of preprocessing on the computing device a packet using valid client rogue access point preprocessor is comprised of the steps of:
   a) determining on the computing device a frame type of the packet;
   b) determining on the computing device if the frame contains a source address;
   c) if the frame does not contain a source address then returning to step (h) in claim 2;
   d) if the frame contains a source address then determining on the computing device if the tame is an authentication request;
   e) if the frame is not an authentication request then returning to step (h) in claim 2;
   f) if the frame is an authentication request then determining on the computing device if the source address is on a rogue client list;
   g) if the source address is on a rogue client address then returning to step (h) in claim 2;
   h) if the source address is not on a rogue client address then determining on the computing device if the source address is on a valid client list;
   i) if the source address is not on the valid client list then returning to step (h) in claim 2;
   j) if the source address is on the valid client list then determining on the computing device if the destination address is rogue;
   k) if the destination address is not rogue then returning to step (h) in claim 2;
   l) if the destination address is rogue then determining on the computing device if the source address is on a bad authentication request list;
   m) if the source address is on a bad authentication request list then returning to step (h) in claim 2; and
   n) if the source address is not on the bad authentication request list then adding on the computing device the source address to the bad authentication request list, generating on the computing device an alert to indicate that an authorized client is attempting to connect to a rogue access point, and returning to step (h) in claim 2.

8. The method of claim 2, wherein the step of preprocessing on the computing device a packet using an ad-hoc network preprocessor is comprised of the steps of:
   a) determining on the computing device a frame type of the packet;
   b) determining on the computing device if the frame contains a source address;
   c) if the frame does not contain a source address then returning to step (h) in claim 2;
   d) if the frame contains a source address then determining on the computing device if the frame is a beacon or a probe response;
   e) if the frame is a beacon or probe response than determining on the computing device if ESS is equal to zero and IBSS is equal to one;
   f) if ESS is not equal to zero or IBSS is not equal to one then returning to step (h) in claim 2;
   g) if ESS is equal to zero and IBSS is equal to one then adding on the computing device the source address to the ad-hoc beacon alert list, generating an ad-hoc beacon detected alert, and returning to step (h) in claim 2;
   h) if the frame is neither a beacon nor a probe request then determining on the computing device if the frame is a data frame;
   i) if the frame is not a data frame then returning to step (h) in claim 2;
   j) if the frame is a data frame then determining on the computing device if to_ds and from_ds are each set to zero;
   k) if to_ds and from_ds are not both set to zero then returning to step (h) in claim 2;
   l) if to_ds and from_ds are each set to zero then determining on the computing device if the source and destination addresses are on an active ad-hoc network alert list;
   m) if the source and destination addresses are on the active ad-hoc network alert list then returning to step (h) in claim 2;
   n) if the source and destination addresses are not on the active ad-hoc network alert list then adding on the computing device the source and destination addresses to the alert list and generating on the computing device an active ad-hoc network detected alert;
   o) determining on the computing device if the source address is on a valid client list;
   p) if the source address is not on the valid client list then determining on the computing device if the destination address is on the valid client list;
   q) if the destination address is not on the valid client list then returning to step (h) in claim 2;
   r) if the destination address is on the valid client list then generating on the computing device an authorized client in ad-hoc conversation with rogue client alert, and returning to step (h) in claim 2;
   s) if the source address is on the valid client list then determining on the computing device if the destination address is on the valid client list;
   t) if the destination address is not on the valid client list then generating on the computing device an authorized client in ad-hoc conversation with rogue client alert, and returning to step (h) in claim 2; and
   u) if the destination address is on the valid client list then returning to step (h) in claim 2.

9. The method of claim 2, wherein the step of preprocessing on the computing device a packet using a wrong channel preprocessor is comprised of the steps of:
   a) determining on the computing device a frame type of the packet;
   b) determining on the computing device if the frame contains a source address;
   c) if the frame does not contain a source address then returning to step (h) in claim 2;
   d) if the frame contains a source address then determining on the computing device the source address in its header;
   e) determining on the computing device if the source address is in a valid client list;
   f) if the source address is not in the valid client list then determining on the computing device if the source address is in a valid access point list;
   g) if the source address is not in the valid access point list then returning to step (h) in claim 2;
   h) if the source address is in the valid client list or not in the valid client list but in the valid access point list then determining and recording on the computing device the designated operating channel;
   i) determining on the computing device if the source address is in a wrong channel alert list;
   j) if the source address is in the wrong channel alert list then returning to step (h) in claim 2;

k) if the source address is not in the wrong channel alert list then determining on the computing device if a transmit channel on which the packet was transmitted is a designated operating channel for the source address;

l) if the transmit channel is equal to the designated operating channel then returning to step (h) in claim 2; and m) if the transmit channel is not equal to the designated operating channel then adding on the computing device the source address to the wrong channel alert list, generating a device operating on the wrong channel alert, and returning to step (h) in claim 2.

10. The method of claim 2, wherein the step of preprocessing on the computing device a packet using a cloaking violation preprocessor is comprised of the steps of:

a) determining on the computing device a frame type of the packet;

b) determining on the computing device if the frame is a beacon;

c) if the frame is not a beacon then returning to step (h) in claim 2;

d) if the frame is a beacon then determining on the computing device if cloaking_required is equal to a one;

e) if cloaking_required is not equal to a one then returning to step (h) in claim 2;

f) if cloaking_required is equal to a one then determining on the computing device if SSID is null;

g) if SSID is null then returning to step (h) in claim 2;

h) if SSID is not null then determining on the computing device if the source address of the packet is on a cloaking policy alert list;

i) if the source address of the packet is on the cloaking policy alert list then returning to step (h) in claim 2; and j) if the source address of the packet is not on the cloaking policy alert list then adding on the computing device the source address to the cloaking policy alert list, generating on the computing device a SSID cloaking policy violation detected alert, and returning to step (h) in claim 2.

11. The method of claim 2, wherein the step of preprocessing on the computing device a packet using an encryption violation preprocessor is comprised of the steps of:

a) determining on the computing device a frame type of the packet;

b) determining on the computing device if the frame is a probe response or a beacon frame;

c) if the frame is neither a probe response nor a beacon frame then determining on the computing device if the frame is a data frame or an authentication frame;

d) if the frame is neither a data frame nor an authentication frame then returning to step (h) in claim 2;

e) if the frame is a probe response, beacon frame, data frame, or authentication frame then determining on the computing device if encryption_required is set to a one;

f) if encryption . . . required is not set to a one then returning to step (h) in claim 2;

g) if encryption_required is set to a one and the frame is a data frame or an authentication frame then determining on the computing device if wep is a one;

h) if wep is a one then returning to step (h) in claim 2;

i) if wep is not a one then determining on the computing device if the source address of the packet is on an encryption policy alert list;

j) if the source address of the packet is on the encryption policy alert list then returning to step (h) in claim 2;

k) if the source address of the packet is not on the encryption policy alert list then adding on the computing device the source address to the encryption policy alert list, generating on the computing device an encryption policy violation detection alert, and returning to step (h) in claim 2;

l) if encryption_required is set to a one and the frame is a beacon or a probe response frame then determining on the computing device if a privacy field is set to a one;

m) if the privacy field is set to a one then returning to step (h) in claim 2;

n) if the privacy field is not set to a one then determining on the computing device if the source address is on the encryption policy alert list;

o) if the source address is on the encryption policy alert list then returning to step (h) in claim 2; and p) if the source address is not on the encryption policy alert list then adding on the computing device the source address to the encryption policy alert list, generating on the computing device an encryption policy violation detection alert, and returning to step (h) in claim 2.

12. The method of claim 2, wherein the step of preprocessing a packet using a null SSID violation preprocessor is comprised of the steps of a) determining on the computing device a frame type of the packet;

b) determining on the computing device if the frame is a probe request;

c) if the frame is a probe request then determining on the computing device if null_ssid_assoc is set to a zero;

d) if null_ssid_assoc is not set to a zero then returning to step (h) in claim 2;

e) if null_ssid_assoc is set to a zero then determining on the computing device if SSID is null;

f) if SSID is not null then returning to step (h) in claim 2;

g) if SKID is set to null then determining on the computing device if the source address of the packet is in a broadcast probe request senders list;

h) if the source address of the packet is in the broadcast probe request senders list then returning to step (h) in claim 2;

i) if the source address of the packet is not in the broadcast probe request senders list then adding on the computing device the source address to the broadcast probe request senders list and returning to step (h) in claim 2;

j) if the frame is not a probe request then determining on the computing device if the frame is a probe response;

k) if the frame is a probe response then determining on the computing device a destination address in its header;

l) determining on the computing device if the destination address is in the broadcast probe request senders list;

m) if the destination address is not in the broadcast probe request senders list then returning to step (h) in claim 2;

n) if the destination address is on the broadcast probe request senders list then determining on the computing device if the source address is on a broadcast probe alert list;

o) if the source address is on the broadcast probe alert list then returning to step (h) in claim 2;

p) if the source address is not on the broadcast probe alert list then adding on the computing device the source address to the broadcast probe alert list, generating on the computing device a Null SSID association alert, and returning to step (h) in claim 2;

q) if the frame is not a probe response then determining on the computing device if the frame is an association request;

r) if the frame is an association request then determining on the computing device if null_ssid_assoc is set to a zero;

s) if null_ssid_assoc is not set to a zero then returning to step (h) in claim 2;
t) if null_ssid_assoc is set to a zero then determining on the computing device if SSID is set to null;
u) if SSID is not set to null then returning to step (h) in claim 2;
v) if SSID is set to null then determining on the computing device if the source address is on a broadcast association request senders list;
w) if the source address is on the broadcast association request senders list then returning to step (h) in claim 2;
x) if the source address is not on the broadcast association request senders list then adding on the computing device the source address to the broadcast association request senders list, and returning to step (h) in claim 2;
y) if the frame is not an association request then determining on the computing device if the frame is an association response;
z) if the frame is not an association response then returning to step (h) in claim 2;
aa) if the frame is an association response then determining on the computing device a destination address in its header;
bb) determining on the computing device if the destination address is on the broadcast association request senders list;
cc) if the destination address is not on the broadcast association request senders list then returning to step (h) in claim 2;
dd) if the destination address is on the broadcast association request senders list then determining on the computing device if the source address is on a broadcast association alert list;
ee) if the source address is on the broadcast association alert list then returning to step (h) in claim 2; and
ff) if the source address is not on the broadcast association alert list then adding on the computing device the source address to the broadcast association alert list, generating on the computing device a Null SSID association alert, and returning to step (h) in claim 2.

13. The method of claim 3, wherein the step of preprocessing on the computing device a packet using a rogue client preprocessor is comprised of the steps of
    a) determining on the computing device a frame type of the packet;
    b) determining on the computing device if the frame type contains a source address;
    c) if the frame type does not contain a source address then returning to step (h) in claim 2;
    d) if the frame contains a source address then finding on the computing device the source address in its header;
    e) determining on the computing device if the packet is from an access point;
    f) if the packet is from an access point then returning to step (h) in claim 2;
    g) determining on the computing device if the source address is in a rogue client
    h) if the source address is not on the rogue client list then determining on the computing device if the source address is on a valid client list;
    i) if the source address is on the valid client list then returning to step (h) in claim 2;
    j) if the packet is not on the valid client list then adding on the computing device the source address to the rogue client list, generating on the computing device an alert message to indicate that a rogue client has been detected, and returning to step (h) in claim 2;
    k) if the source address is on the rogue client list then determining on the computing device if a user-defined time period has expired;
    l) if the user-definable time-period has not expired then returning to step (h) in claim 2; and
    m) if the user-definable time-period has expired then adding on the computing device the source address to the rogue client list, generating on the computing device an alert message to indicate that a rogue client had been detected, and returning to step (h) in claim 2.

14. The method of claim 13, wherein the step of preprocessing on the computing device a packet using a bridged network preprocessor is comprised of the steps of:
    a) finding on the computing device a frame type of the packet;
    b) determining on the computing device if the frame contains a source address;
    c) if the frame type does not contain a source address then returning to step (h) in claim 2;
    d) if the frame contains a source address then determining on the computing device if the frame is a data frame;
    e) if the frame is not a data frame then returning to step (h) in claim 2;
    f) if the frame is a data frame then determining on the computing device if to_ds and from_ds are each set to one;
    g) if to_ds and from_ds are not both set to one then returning to step (h) in claim 2;
    h) if to_ds and from_ds are each set to one then determining on the computing device if the source and destination addresses are on an alert list;
    i) if the source and destination addresses are on the alert list then determining on the computing device if a user-definable time-period has expired;
    j) if the user-definable time-period has not expired then returning to step (h) in claim 2; and
    k) if either the user-definable time-period has expired or if the source and destination addresses are not on the alert list then adding on the computing device the source and destination addresses to the alert list, generating on the computing device an alert that indicates that a bridged network has been detected, and returning to step (h) in claim 2.

15. The method of claim 14, wherein the step of preprocessing on the computing device a packet using a rogue client valid access point preprocessor is comprised of the steps of:
    a) finding on the computing device a frame type of the packet;
    b) determining on the computing device if the frame contains a source address;
    c) if the frame does not contain a source address then returning to step (h) in claim 2;
    d) if the frame contains a source address then determining on the computing device if the frame is an authentication request;
    e) if the frame is an authentication request then determining on the computing device if the source address is on a rogue client list;
    f) if the frame is not an authentication request then returning to step (h) in claim 2;
    g) if the source address is not on the rogue client list then determining on the computing device if the source address is on the valid client list;
    h) if the source address is on the valid client list then returning to step (b) in claim 2;

i) if the source address is on the rogue client list or not on the rogue client list or the valid client list then determining on the computing device if the destination access point address is valid;

j) if the destination access point address is not valid then returning to step (h) in claim 2;

k) if the destination access point address is valid then determining on the computing device if the source address is on a bad authentication request list;

l) if the source address is on the bad authentication request list then returning to step (h) in claim 2; and m) if the source address is not on the bad authentication request list then adding on the computing device the source address to the bad authentication request list, generating on the computing device an alert to indicate that an unauthorized client is attempting to connect to a valid access point, and returning to step (h) in claim 2.

16. The method of claim 15, wherein the step of preprocessing on the computing device a packet using valid client rogue access point preprocessor is comprised of the steps of:

a) determining on the computing device a frame type of the packet;

b) determining on the computing device if the frame contains a source address;

c) if the frame does not contain a source address then returning to step (h) in claim 2;

d) if the frame contains a source address then determining on the computing device if the frame is an authentication request;

e) if the frame is not an authentication request then returning to step (h) in claim 2;

f) if the frame is an authentication request then determining on the computing device if the source address is on a rogue client list;

g) if the source address is on a rogue client address then returning to step (h) in claim 2;

h) if the source address is not on a rogue client address then determining on the computing device if the source address is on a valid client list;

i) if the source address is not on the valid client list then returning to step (h) in claim 2;

j) if the source address is on the valid client list then determining on the computing device if the destination address is rogue;

k) if the destination address is not rogue then returning to step (h) in claim 2;

l) if the destination address is rogue then determining on the computing device if the source address is on a bad authentication request list;

m) if the source address is on a bad authentication request list then returning to step (h) in claim 2; and n) if the source address is not on the bad authentication request list then adding on the computing device the source address to the bad authentication request list, generating on the computing device an alert to indicate that an authorized client is attempting to connect to a rogue access point, and returning to step (h) in claim 2.

17. The method of claim 16, wherein the step of preprocessing on the computing device a packet using an ad-hoc network preprocessor is comprised of the steps of:

a) determining on the computing device a frame type of the packet;

b) determining on the computing device if the frame contains a source address;

c) if the frame does not contain a source address then returning to step (h) in claim 2;

d) if the frame contains a source address then determining on the computing device if the frame is a beacon or a probe response;

e) if the frame is a beacon or probe response then determining on the computing device if ESS is equal to zero and IBSS is equal to one;

f) if ESS is not equal to zero or IBSS is not equal to one then returning to step (h) in claim 2;

g) if ESS is equal to zero and IBSS is equal to one then adding on the computing device the source address to the ad-hoc beacon alert list, generating on the computing device an ad-hoc beacon detected alert, and returning to step (h) in claim 2;

h) if the frame is neither a beacon nor a probe request then determining on the computing device if the frame is a data frame;

i) if the frame is not a data frame then returning to step (h) in claim 2;

j) if the frame is a data frame then determining on the computing device if to_ds and from_ds are each set to zero;

k) if to_ds and from_ds are not both set to zero then returning to step (h) in claim 2;

l) if to_ds and from_ds are each set to zero then determining on the computing device if the source and destination addresses are on an active ad-hoc network alert list;

m) if the source and destination addresses are on the active ad-hoc alert list then returning to step (h) in claim 2;

n) if the source and destination addresses are not on the active ad-hoc network alert list then adding on the computing device the source and destination addresses to the alert list and generating on the computing device an active ad-hoc network detected alert;

o) determining on the computing device if the source address is on a valid client list;

p) if the source address is not on the valid client list then determining on the computing device if the destination address is on the valid client list;

q) if the destination address is not on the valid client list then returning to step (h) in claim 2;

r) if the destination address is on the valid client list then generating on the computing device an authorized client in ad-hoc conversation with rogue client alert, and returning to step (h) in claim 2;

s) if the source address is on the valid client list then determining on the computing device if the destination address is on the valid client list;

t) if the destination address is not on the valid client list then generating on the computing device an authorized client in ad-hoc conversation with rogue client alert, and returning to step (h) in claim 2; and u) if the destination address is on the valid client list then returning to step (h) in claim 2.

18. The method of claim 17, wherein the step of preprocessing on the computing device a packet using a wrong channel preprocessor is comprised of the steps of:

a) determining on the computing device a frame type of the packet;

b) determining on the computing device if the frame contains a source address;

c) if the frame does not contain a source address then returning to step (h) in claim 2;

d) if the frame contains a source address then determining on the computing device the source address in its header;

e) determining on the computing device if the source address is in a valid client list;

f) if the source address is not in the valid client list then determining on the computing device if the source address is in a valid access point list;
g) if the source address is not in the valid access point list then returning to step (h) in claim 2;
h) if the source address is in the valid client list or not in the valid client list but in the valid access point list then determining and recording on the computing device the designated operating channel;
i) determining on the computing device if the source address is in a wrong channel alert list;
j) if the source address is in the wrong channel alert list then returning to step (h) in claim 2;
k) if the source address is not in the wrong channel alert list then determining on the computing device if a transmit channel on which the packet was transmitted is a designated operating channel for the source address;
l) if the transmit channel is equal to the designated operating channel then returning to step (h) in claim 2; and
m) if the transmit channel is not equal to the designated operating channel then adding on the computing device the source address to the wrong channel alert list, generating on the computing device a device operating on the wrong channel alert, and returning to step (h) in claim 2.

19. The method of claim 18, wherein the step of preprocessing on the computing device a packet using a cloaking violation preprocessor is comprised of the steps of
a) determining on the computing device a frame type of the packet;
b) determining on the computing device if the frame is a beacon;
c) if the frame is not a beacon then returning to step (h) in claim 2;
d) the frame is a beacon then determining on the computing device if cloaking_required is equal to a one;
e) if cloaking_required is not equal to a one then returning to step (h) in claim 2;
f) if cloaking_required is equal to a one then determining on the computing device if SSID is null;
g) if SSID is null then returning to step (h) in claim 2;
h) if SSID is not null then determining on the computing device if the source address of the packet is on a cloaking policy alert list;
i) if the source address of the packet is on the cloaking policy alert list then returning to step (h) in claims 2; and
j) if the source address of the packet is not on the cloaking policy alert list then adding on the computing device the source address to the cloaking policy alert list, generating on the computing device a SSID cloaking policy violation detected alert, and returning to step (h) in claim 2.

20. The method of claim 19, wherein the step of preprocessing on the computing device a packet using an encryption violation preprocessor is comprised of the steps of:
a) determining on the computing device a frame type of the packet;
b) determining on the computing device if the frame is a probe response or a beacon frame;
c) if the frame is neither a probe response nor a beacon frame then determining on the computing device if the frame is a data frame or an authentication frame;
d) if the frame is neither a data frame nor an authentication frame then returning to step (h) in claim 2;
e) if the frame is a probe response, beacon frame, data frame, or authentication frame then determining on the computing device if encryption_required is set to a one;
f) if encryption_required is not set to a one then returning to step (h) in claim 2;
g) if encryption_required is set to a one and the frame is a data frame or an authentication frame then determining on the computing device if wep is a one;
h) if wep is a one then returning to step (h) in claim 2;
i) if wep is not a one then determining on the computing device if the source address of the packet is on an encryption policy alert list;
j) if the source address of the packet is on the encryption policy alert list then returning to step (h) in claim 2;
k) if the source address of the packet is not on the encryption policy list then adding on the computing device the source address to the encryption policy alert list, generating on the computing device an encryption policy violation detection alert, and returning to step (h) in claim 2;
l) if encryption_required is set to a one and the frame is a beacon frame or a probe response frame then determining on the computing device if a privacy field is set to a one;
m) if the privacy field is set to a one then returning to step (h) in claim 2;
n) if the privacy field is not set to a one then determining on the computing device if the source address is on the encryption policy alert list;
o) if the source address is on the encryption policy alert list then returning to step (h) in claim 2; and
p) if the source address is not on the encryption policy alert list then adding on the computing device the source address to the encryption policy alert list, generating on the computing device an encryption policy violation detection alert, and returning to step (h) in claim 2.

21. The method of claim 20, wherein the step of preprocessing on the computing device a packet using a null SSID violation preprocessor is comprised of the steps of:
a) determining on the computing device a frame type of the packet;
b) determining on the computing device if the frame is a probe request;
c) if the frame is a probe request then determining on the computing device if null_ssid_assoc is set to a zero;
d) if null_ssid_assoc is not set to a zero then returning to step (h) in claim 2;
e) if null_ssid_assoc is set to a zero then determining on the computing device if SSID is null;
f) if SSID is not null then returning to step (h) in claim 2;
g) if SSID is set to null then determining on the computing device if the source address of the packet is in a broadcast probe request senders list;
h) if the source address of the packet is in the broadcast probe request senders list then returning to step (h) in claim 2;
i) if the source address of the packet is not in the broadcast probe request senders list then adding on the computing device the source address to the broadcast probe request senders list and returning to step (h) in claim 2;
j) if the frame is not a probe request then determining on the computing device if the frame is a probe response;
k) if the frame is a probe response then determining on the computing device a destination address in its header;
l) determining on the computing device if the destination address is in the broadcast probe request senders list;
m) if the destination address is not in the broadcast probe request senders list then returning to step (h) in claim 2;

n) if the destination address is on the broadcast probe request senders list then determining on the computing device if the source address is on a broadcast probe alert list;
o) if the source address is on the broadcast probe alert list then returning to step (h) in claim 2;
p) if the source address is not on the broadcast probe alert list then adding on the computing device the source address to the broadcast probe alert list, generating on the computing device a Null SSID association alert, and returning to step (h) in claim 2;
q) if the frame is not a probe response then determining on the computing device if the frame is an association request;
r) if the frame is an association request then determining on the computing device if null_ssid_assoc is set to a zero;
s) if null_ssid_assoc is not set to a zero then returning to step (h) in claim 2;
t) if null_ssid_assoc is set to a zero then determining on the computing device if SSID is set to null;
u) if SSID is not set to null then returning to step (h) in claim 2;
v) if SSID is set to null then determining on the computing device if the source address is on a broadcast association request senders list;
w) if the source address is on the broadcast association request senders list then returning to step (h) in claim 2;
x) if the source address is not on the broadcast association request senders list then adding on the computing device the source address to the broadcast association request senders list, and returning to step (h) in claim 2;
y) if the frame is not an association request then determining on the computing device if the frame is an association response;
z) if the frame is not an association response then returning to step (h) in claim 2;
aa) if the frame is an association response then determining on the computing device a destination address in its header;
bb) determining on the computing device if the destination address is on the broadcast association request senders list;
cc) if the destination address is not on the broadcast association request senders list then returning to step (h) in claim 2;
dd) if the destination address is on the broadcast association request senders list then determining on the computing device if the source address is on a broadcast association alert list;
ee) if the source address is on the broadcast association alert list then returning to step (h) in claim 2; and
ff) if the source address is not on the broadcast association alert list then adding on the computing device the source address to the broadcast association alert list, generating on the computing device a Null SSID association alert, and returning to step (h) in claim 2.

* * * * *